US006926025B1

(12) United States Patent
Sibley et al.

(10) Patent No.: US 6,926,025 B1
(45) Date of Patent: Aug. 9, 2005

(54) SHOCK ACTUATED RESPONSIVE MECHANISM WITH IMPROVED LEVERAGED VALVE CLOSING ACTIVATION MEANS FOR VERTICAL FLUID VALVE ASSEMBLIES

(75) Inventors: Richard D. Sibley, Lancaster, CA (US); Richard F. Christensen, Sr., Rosamond, CA (US); William F. Keller, Lancaster, CA (US)

(73) Assignee: Pacific Seismic Products, Inc., Lancaster, CA (US)

( * ) Notice: Subject to any disclaimer, the term of this patent is extended or adjusted under 35 U.S.C. 154(b) by 221 days.

(21) Appl. No.: 10/300,973

(22) Filed: Nov. 20, 2002

Related U.S. Application Data

(63) Continuation-in-part of application No. 10/160,981, filed on May 30, 2002, now Pat. No. 6,527,004, which is a continuation-in-part of application No. 10/041, 102, filed on Dec. 28, 2001, now Pat. No. 6,502,599, which is a continuation-in-part of application No. 09/668,003, filed on Sep. 21, 2000, now Pat. No. 6,394,122.

(51) Int. Cl.[7] .................... G05G 17/00; F16K 17/36
(52) U.S. Cl. ..................... 137/38; 137/39; 251/74; 251/303
(58) Field of Search ................ 137/38, 39, 15.01; 251/274, 303

(56) References Cited

U.S. PATENT DOCUMENTS

| | | | | |
|---|---|---|---|---|
| 4,185,507 A | * | 1/1980 | Domyan ......................... 74/2 |
| 4,513,629 A | * | 4/1985 | Keller et al. .................... 74/2 |
| 4,603,591 A | * | 8/1986 | Sibley et al. .................... 74/2 |
| 4,782,848 A | * | 11/1988 | Sibley et al. ................. 137/38 |
| 4,915,122 A | * | 4/1990 | Ikegaya et al. .............. 137/38 |

* cited by examiner

*Primary Examiner*—A. Michael Chambers
(74) *Attorney, Agent, or Firm*—Thomas I. Rozsa; Tony D. Chen

(57) ABSTRACT

A vertical shock responsive fluid valve assembly capable of automatically closing a fluid valve in response to earthquake forces or other shock forces of a predetermined magnitude. The vertical shock responsive valve assembly has a flow control mechanism having a cradle that holds a movable ball in a recess at a point perpendicular in relation to a horizontal base plate, where the ball can be rotated 360° in any direction during seismic actions or other shock forces and rolls out of its recess at a predetermined force such that it ricochets off a housing cover covering the cradle and pushes a trip fork mechanism having elongated walls to provide additional leverage when the force strikes the trip fork mechanism that is mounted on a pivoting mechanism, thereby releasing a swing arm which has a disc on the end that functions as a plug for the hole in the valve body to interrupt gas or fluid flow therein.

38 Claims, 21 Drawing Sheets

SHOCK ACTUATED RESPONSIVE MECHANISM WITH IMPROVED LEVERAGED VALVE CLOSING ACTIVATION MEANS FOR VERTICAL FLUID VALVE ASSEMBLIES

This application is a continuation-in-part of application Ser. No. 10/160,981 filed on May 30, 2002, now U.S. Pat. No. 6,527,004, which application is a continuation-in-part of application Ser. No. 10/041,102 filed on Dec. 28, 2001, now U.S. Pat. No. 6,502,599, which application is a continuation-in-part of application Ser. No. 09/668,003 filed on Sep. 21, 2000, now U.S. Pat. No. 6,394,122 issued May 28, 2002.

BACKGROUND OF THE INVENTION

1. Field of the Invention

This invention relates to valves and valve devices for automatically closing a valve to stop the flow of a fluid in a conduit when the device is subjected to shock and vibration forces such as experienced during an earthquake. The improved shock sensor and actuation device uses gravity to aid in activating a valve closure mechanism.

2. Description of the Prior Art

Various mechanisms to sense shock and vibration to activate the closing of a valve exist in the art. Such shock actuated valves generally are inserted in a fluid flow line, have a rotating valve element for opening and closing the fluid flow line, and have a mechanism to maintain an open valve position until such time as a shock or vibration of specified characteristics is sensed by a device which then causes the valve to close.

The present invention relates to shutoff valves which use a weight in the form of a ball to sense shock or vibration which force displaces the ball from a normal rest location to actuate a mechanism to cause a valve to close. Reference to U.S. Pat. No. 4,915,122 issued Apr. 10, 1990 shows a shock actuated valve which uses a ball motion to actuate a valve due to earthquake forces and similar shock forces. The improved device modifies the pedestal on which the ball rests to allow gravity force to act on the ball once it has been moved from its position of rest to aid in the actuation of the shock actuation control mechanism. The modification of adding a step to the pedestal upper perimeter surface improves the accuracy for the elapsed time for the valve to be actuated once a specified force has been sensed. In previous art mechanisms the ball motion may be compounded by the ball not initially actuating the shock actuation control mechanism due to for example the ball moving, but rebounding or retreating from an initially urged position to be moved to a second position by the forces. These non-actuating motions of the ball delay valve closure which may increase the possibility of damage as for examples during an earthquake.

It is desirable to provide a vertical shock responsive fluid valve assembly with the capability of automatically closing a fluid valve in response to earthquake forces or other shock forces of a predetermined magnitude.

SUMMARY OF THE INVENTION

One object of the invention is to improve reliability of the closure of a fluid valve when specified shock and vibration forces are sensed by a sensor mechanism element of the fluid valve. Another object is to improve the repeatability of the actuation of the fluid valve automatic closure.

Alternatively, the present invention is a vertical shock responsive fluid valve assembly capable of automatically closing a fluid valve in response to earthquake forces or other shock forces of predetermined magnitude.

It is an object of the present invention to provide a vertical shock responsive valve assembly which is adapted to automatically close off the flow of a controlled fluid in response to earthquake forces or other shock forces of a predetermined magnitude.

It is an additional object of the present invention to provide a vertical shock responsive valve assembly which includes a flow control mechanism having a cradle that holds a movable ball in a recess at a point perpendicular in relation to a horizontal base plate, where the ball can be rotated 360° in any direction during seismic actions or other shock forces and rolls out of its recess at a predetermined force such that it ricochets off a housing cover covering the cradle and pushes a pipe that is mounted on a pivoting parallelogram lever mechanism, thereby releasing a swing arm which has a disc on the end that functions as a plug for the hole in the valve body to interrupt gas or fluid flow therein.

It is also an additional object of the present invention to provide a vertical shock responsive valve assembly which includes a flow control mechanism having a cradle that holds a movable ball in a recess at a point perpendicular in relation to a horizontal base plate, where the ball can be rotated 360° in any direction during seismic actions or other shock forces and rolls out of its recess at a predetermined force such that it ricochets off a housing cover covering the cradle and pushes a trip fork that is mounted on a pivoting parallelogram lever mechanism, thereby releasing a swing arm which has a disc on the end that functions as a plug for the hole in the valve body to interrupt gas or fluid flow therein.

It is a further object of the present invention to provide a vertical shock responsive fluid valve assembly that actuates a controlled valve entirely mechanically, to avoid the necessity for provision of an auxiliary pneumatic, electrical or other power source, and thereby prevent problems which might be caused by failure of such a power source.

It is a further object of the present invention to provide a vertical shock responsive fluid valve assembly with an improved leveraged valve closing actuation means that actuates a controlled valve entirely mechanically, to avoid the necessity for provision of an auxiliary pneumatic, electrical, or other power source, and thereby prevent problems which might be caused by failure of such power source.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
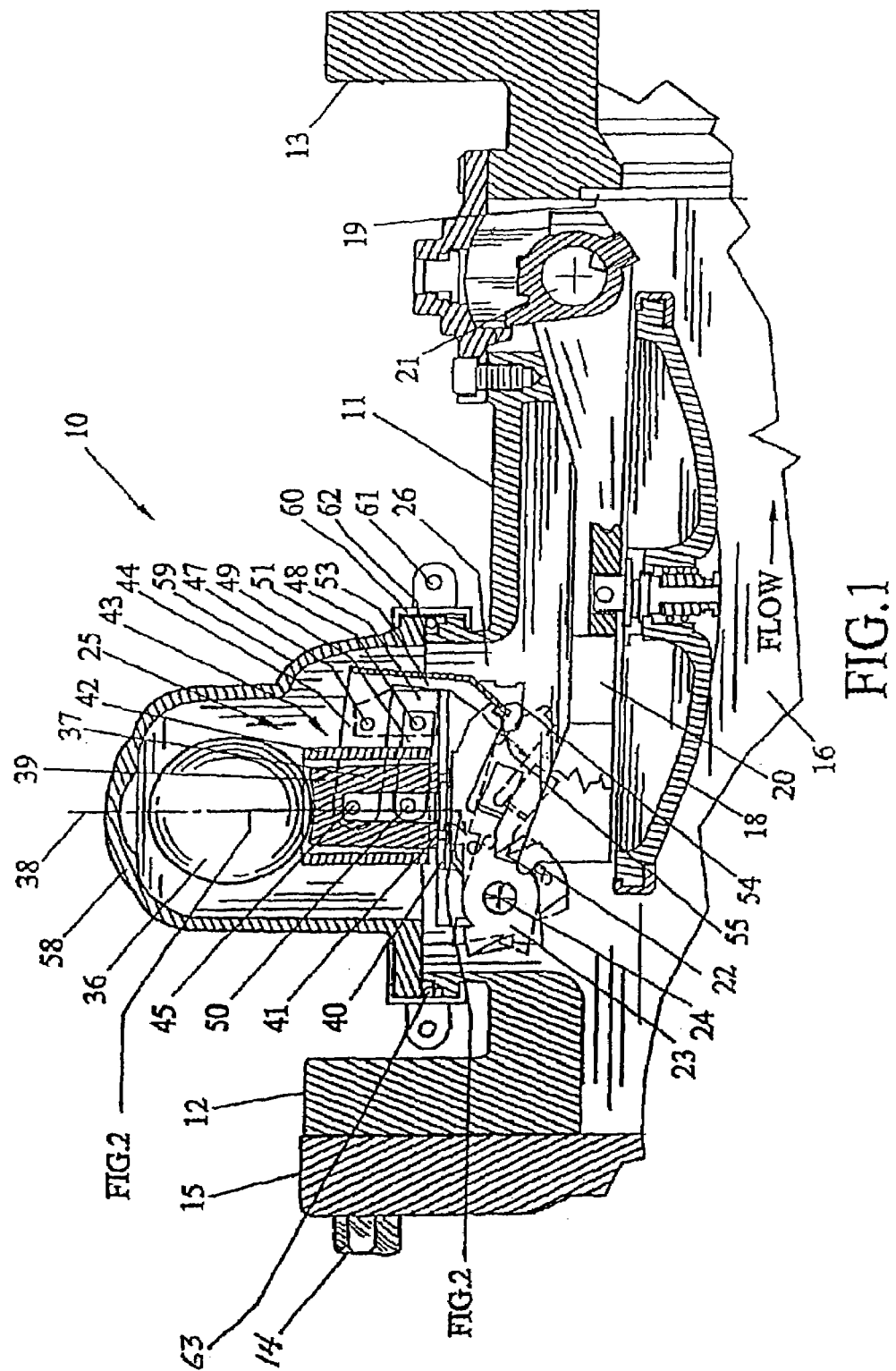
FIG. 1 illustrates a fragmental vertical sectional elevation view of an open shock action valve as disclosed in prior art.

Referring to FIG. 1, an automatic shock actuated valve of the prior art is illustrated. This valve is that disclosed in U.S. Pat. No. 4,915,122 issued Apr. 10, 1990 and which valve description is incorporated herein by reference for disclosure of the preferred embodiment of the instant invention. The prior art reference includes as co-inventors the two inventors of this instant disclosure. While this prior art reference is included to present a preferred embodiment of the improvement mechanism, it is understood the structure and principles can be used with other ball weight actuating valves.

There is illustrated a shock and vibration force responsive valve assembly (10) which is adapted to automatically close off the control of a fluid through a conduit. The assembly includes a tubular main body (11) having flanges (12) and (13) at its opposite ends connectable by fasteners (14) to abutting flanges (15) of adjacent conduit or pipe sections to connect the body into a pipeline. The illustration orientation is such that fluid, for example, natural gas, flows in a left to right direction as viewed in FIG. 1 in an inner passage (16), partially illustrated, in body (11) and parallel to a central horizontal axis of the passage.

The flow control mechanism includes a circular valve element (18) which is engageable with an annular seat (19) formed in body (11) to close off the flow of fluid through the assembly (10) valve element (18) is carried by arm (20) which swings about a horizontal axis (21) between a closed position and the open position illustrated in FIG. 1. Arm (20) and the carried valve disc (18) are releasably retained in the open position by engagement of arm (20) with latch pin (22)

carried by a second arm (23) which is mounted for swinging movement about a horizontal axis (24) between the position illustrated in FIG. 1 and the dashed line position illustrated therein. Arm (23) is in turn releasably retained in position by a shock actuation control mechanism (25). The control mechanism (25) is principally contained in housing (58) having bulge (59). The housing (58) is attached to the tubular main body (11) at annular flanges (62) which have a sealing O-Ring (63). The housing (58) is retained by circular clamp (60) and fasteners (61).

The control mechanism (25) includes a weight or mass (36) illustrated as a ball. When disc valve (18) is in the open position the ball (36) is supported on a pedestal (37) extending upwardly along vertical axis (38). The pedestal as illustrated is an externally cylindrical form about axis (38) and has an upwardly facing shallow circular recess (39) to retain the ball (36) in its centered, at rest position. The pedestal (37) is attached to the body (11) by plate (40) and fasteners (41).

Figure 2:
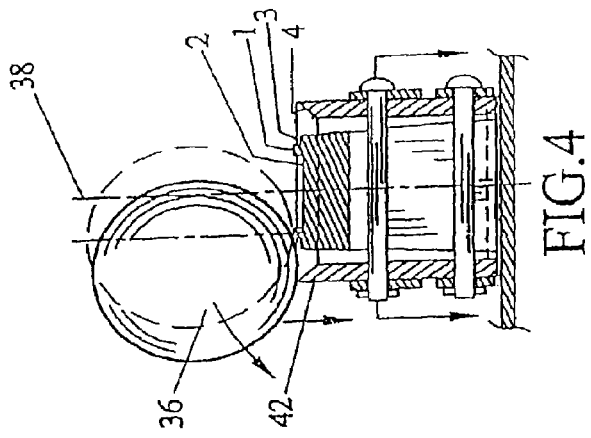
FIG. 2 illustrates a fragmented generally vertical sectional view of the shock actuation control mechanism taken along line 2—2 of FIG. 1 and includes the ball in its rest position on the pedestal as disclosed in prior art.

Referring to FIGS. 1 and 2, a vertical tube (42) centered about axis (38) is disposed about and spaced from pedestal (37), and is movable upwardly and downwardly relative to the pedestal (37). The tube (42) is mounted for vertical movement by a parallelogram mechanism (43), including two similar parallel upper links (44) each pivoted at one end to the tube (42) by a horizontal pin (45) extending through vertical slot (46) in pedestal (37), and each pivoted by a second parallel horizontal pin (47) to a pair of vertical bracket arms (48) projecting upwardly from and attached to plate (40). The parallelogram mechanism also includes two similar parallel lower links (49) each pivoted by a first pin (50) to tube (42) and by a second pin (51) to bracket arms (48). A downward movement of the tube (42) causes a rightward swinging movement of cross pin (54) to release arm (20) for closure of the valve (10) by seating valve element (18) by a spring force.

The tube (42) is yieldingly urged upwardly, as for example by a leaf spring or plate spring (57). When ball (36) is moved laterally from its centered position in any horizontal direction relative to pedestal (37) the weight engages the upper edge of tube (42) and displaces the tube (42) downwardly relative to the pedestal to move cross pin (54) carried on projection (53) out of notch (55) in arm (23) and allows downward swinging movement of arm (23) to cause the valve to close. The amount of shock or vibration force to displace ball (36) from recess (39) is determined by the shape and depth of the recess (39) and the mass of the ball (36). In some instances the ball (36) may be displaced by a force which causes ball (36) partial engagement with vertical tube (42), but due to force frequency or other factors the ball (36) does not downwardly displace the vertical tube (42) sufficiently and the ball (36) retreats to a second position. This motion delays the actuation of the valve (10) and thereby the ceasing of flow of the fluid.

Figure 4:
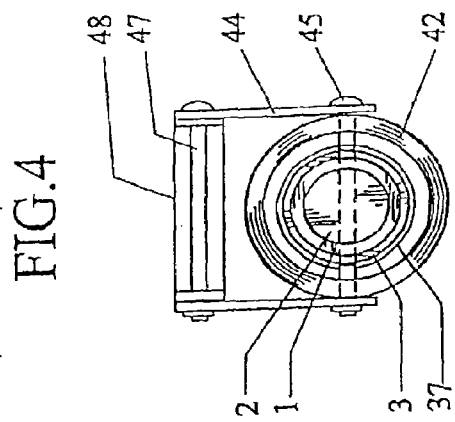
FIG. 4 illustrates a fragmented generally vertical sectional view of the shock actuation control mechanism with the ball displaced from its state of rest to engage the vertical tube.
Figure 3:
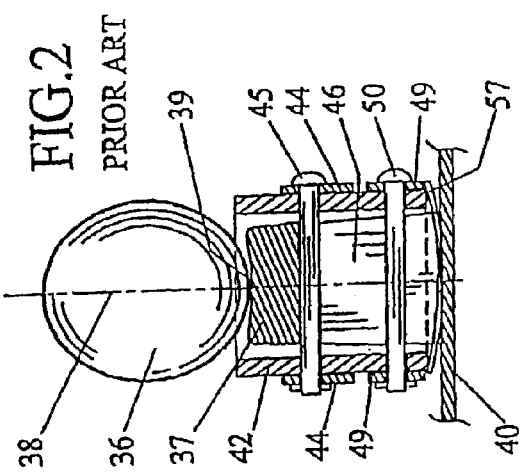
FIG. 3 illustrates a fragmented generally vertical sectional view of the shock actuation control mechanism with improved pedestal.
Figure 5:
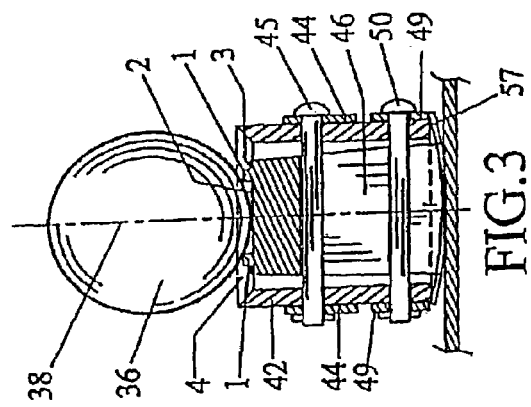
FIG. 5 illustrates a top plan view of the shock actuation control mechanism.
Figure 6:
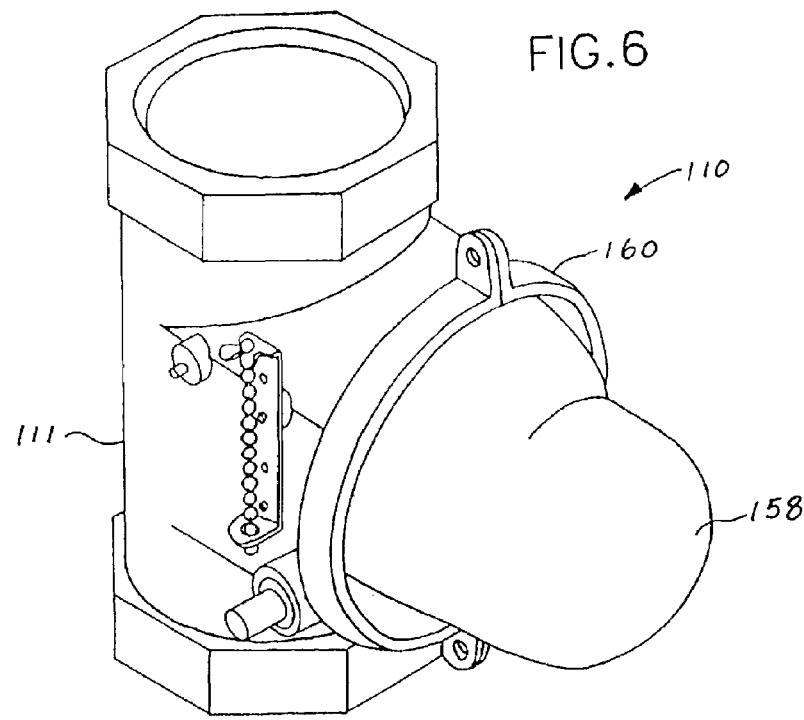
FIG. 6 is a perspective view of alternatively the present invention of a vertical shock responsive valve assembly.
Figure 7:
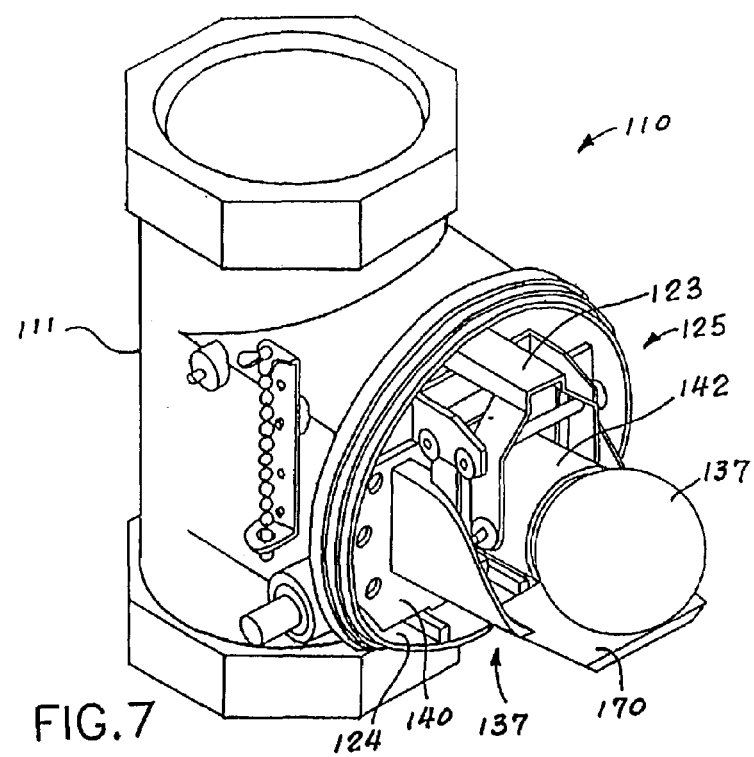
FIG. 7 is a perspective of the present invention vertical shock responsive valve assembly without the housing cover attached thereto.

Referring to FIGS. 3 through 5, an improved pedestal (37) embodiment is illustrated. The pedestal (37) upper end has been modified to create a ridge (1) or circular protrusion with generally cylindrical recess (2) therein and a step or offset (3) circumferentially formed external to the ridge (1). While a cylindrical recess is discussed in the embodiment other recess shapes, such as that disclosed in the prior art, may be used with the circumferential external offset (3). The ball (36) is supported on pedestal (37) and retained in its central, at rest position by ridge (1).

When a shock or vibration force is experienced by the shock actuation control mechanism (25), the ball (36) is displaced when such force reaches a specified value. If the force is of sufficient strength and duration, the ball (36) is urged upwardly and over the ridge (1). Once the center of gravity of the ball (36) passes the vertical center position of the ridge (1), gravitational force will act on the ball (36) to move it downwardly toward offset (3). This vertical gravitational force combines with the horizontal force displacing the ball (36) to force the vertical tube (42) in a downwardly direction actuating closure of the valve (18).

The offset (3) must be sized to aid the ball (36) engagement with vertical tube (42), but not be so large as to inhibit the return of the ball (36) to its central position when the valve assembly (10) is reset after the shock and vibration forces have ceased. The vertical tube (42) top end may also be beveled (4) for more controlled uniform force application by the ball (36). The diameter of the ridge (1) and the size of the offset (3) are adjusted to cause the valve to close upon sensing the specified motion forces. In this embodiment the value at which the ball (36) will be caused to engage the vertical tube (42) may be adjusted by changing the inside diameter of the ridge (1). It has been found by experiment that for minor adjustment the ball (36) may be impacted by a force, as from example a hammer, causing a spreading impact force to the ridge (1).

Use of the improved pedestal structure has been found by experiment to improve the accuracy of the time for mechanism response to specified shock and vibration forces to be repeatable to within 0.001 of a second.

Referring to FIGS. 6 through 9, alternatively, there is shown at 110 the present invention shock and vibration force responsive valve assembly which is adapted to automatically close off the flow of a controlled fluid such as natural gas through a conduit in response to seismic forces or other shock forces of a predetermined magnitude. The valve assembly 110 includes a tubular main valve body 111 having flanges 112 and 113 at its opposite ends connectable by fasteners to abutting flanges of adjacent conduit sections or pipe sections (not shown) to connect the main body 111 into a pipeline. It may be assumed that natural gas or another controlled fluid flows in a downward direction (top to bottom) as shown by the flow arrow 109 through an inner passage 116 formed in the main body 111 and parallel to a central vertical axis 117 of the inner passage 116.

Figure 8:
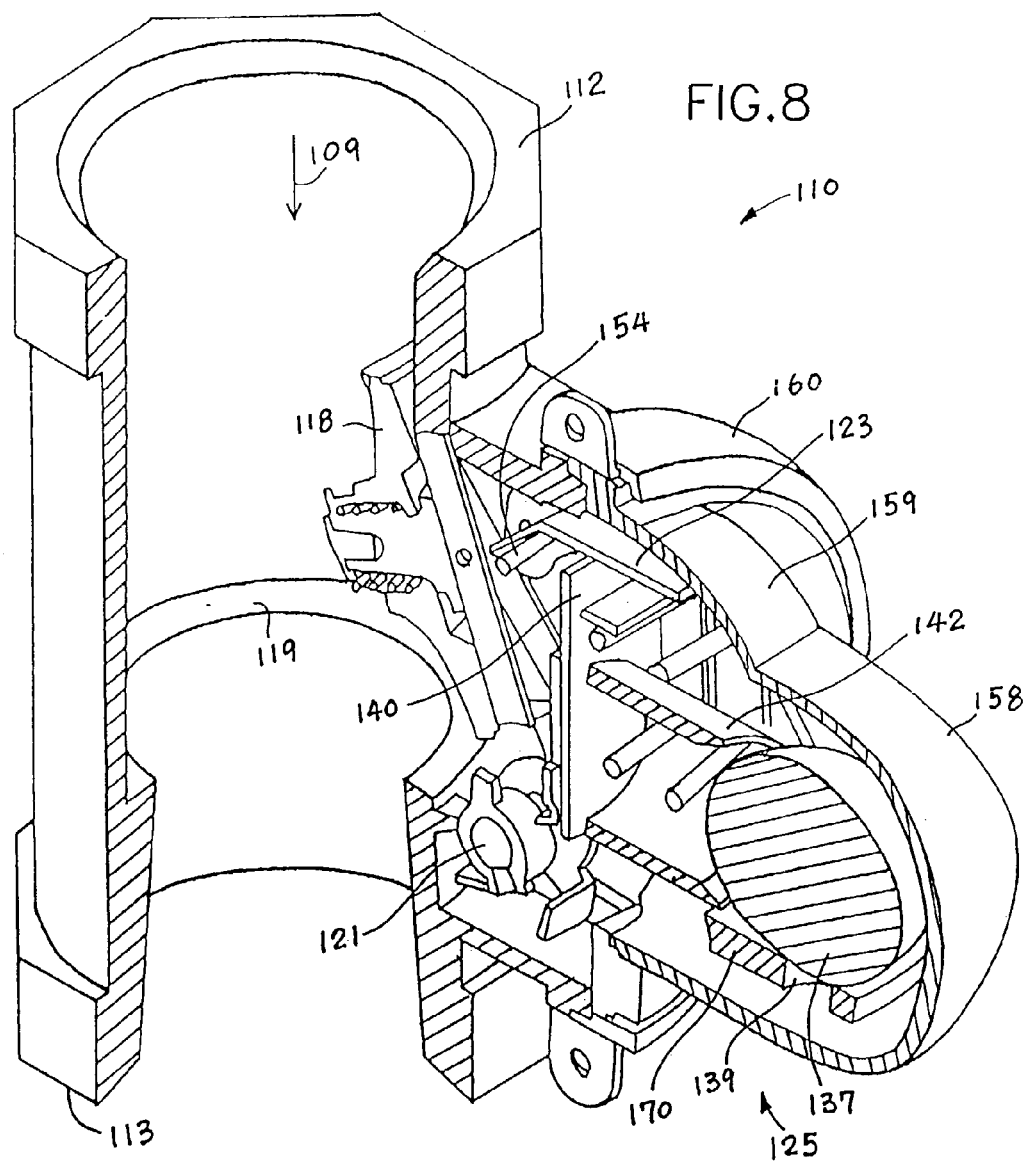
FIG. 8 is an enlarged fragmentary view of the present invention vertical shock responsive valve assembly, showing the flow control mechanism in its open condition.
Figure 9:
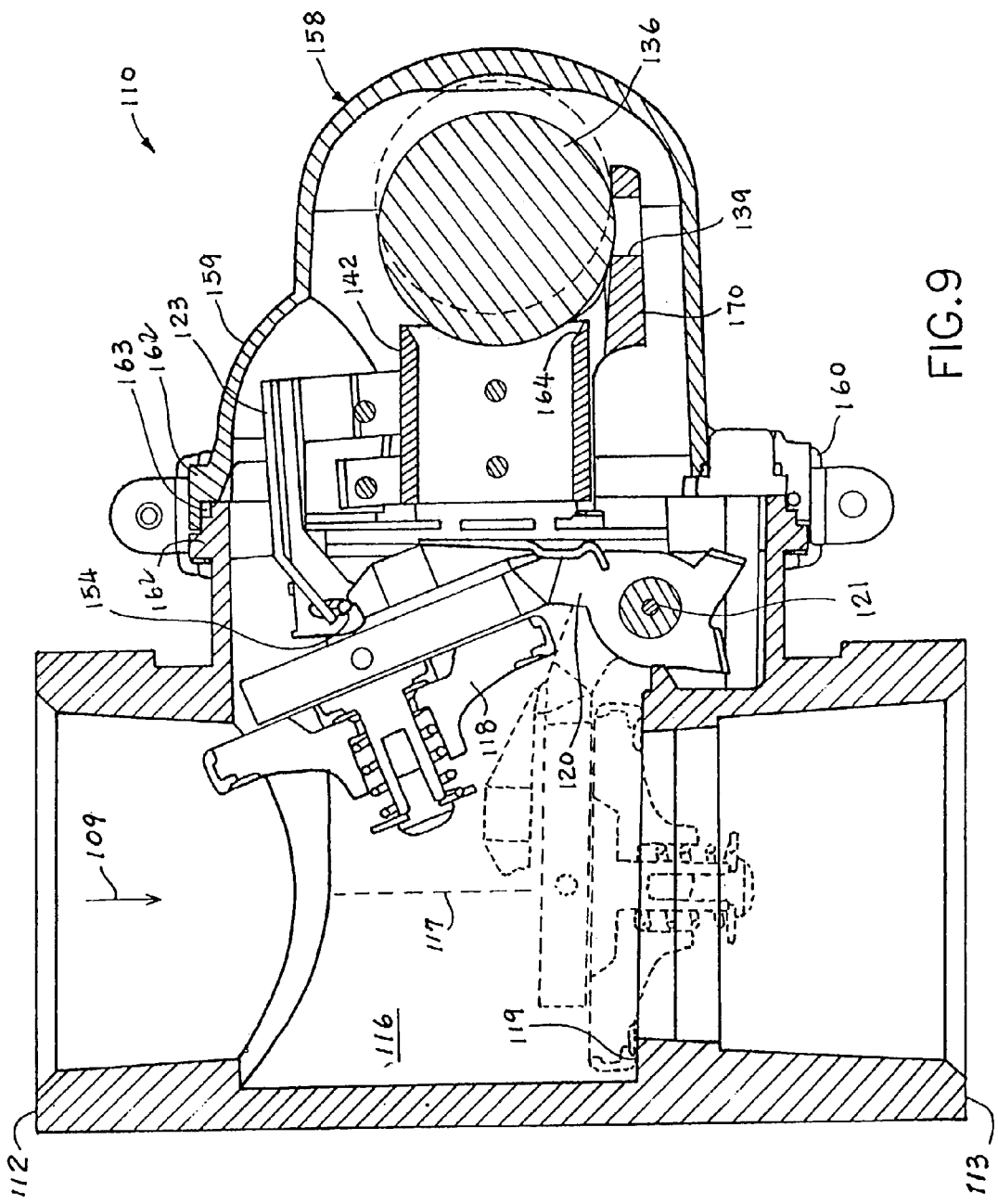
FIG. 9 is a cross-sectional view of the present invention vertical shock responsive valve assembly, showing the flow control mechanism in dashed lines in its closed condition.

The valve assembly 110 further includes a flow control mechanism which has a circular disc valve 118 engageable with an annular seat 119 formed in the main valve body 111 to close off the flow of fluid through the valve assembly 110 (see FIG. 9). The disc valve 118 is carried by a swing arm 120 which swings about a horizontal axis 121 between the closed condition (see FIG. 9) and the open condition (see FIG. 8). The arm 120 and the carried disc valve 118 are releasably retained in the open condition of the valve by engagement of the arm 120 with a latch pin 154 carried by a projection trip arm 123. The trip arm 123 is in turn releasably retained in its position by a shock responsive mechanism 125 which is contained within a dome shaped housing cover 158 having a bulge 159. The housing cover 158 is attached to the tubular main body 111 at annular flanges 162 which have a sealing O-Ring 163 or other gasket. The housing cover 158 is retained by a circular clamp 160 typically formed of two semicircular sections secured together at their opposite ends by fasteners such as screws, rivets, or other suitable fasteners.

Figure 10:
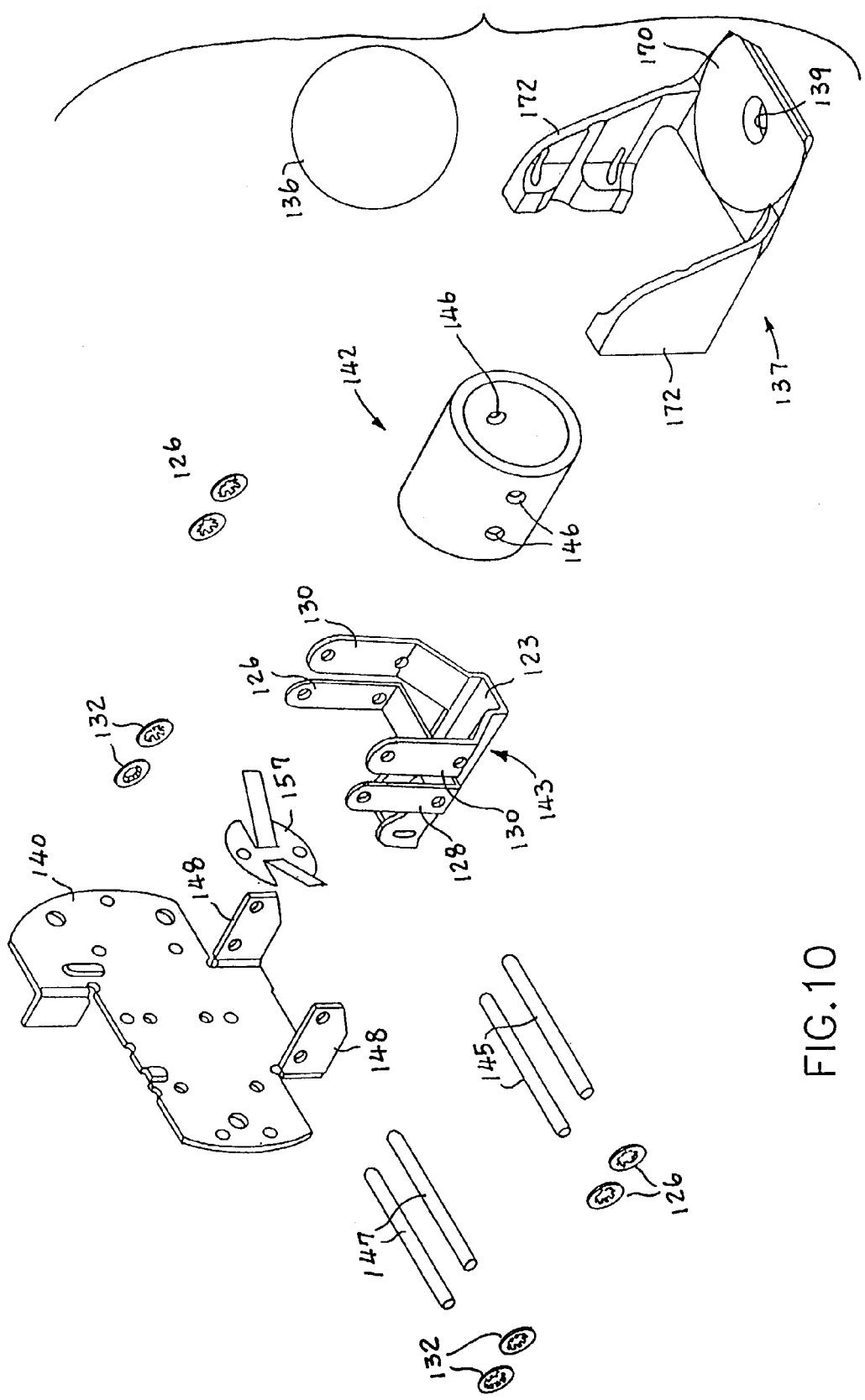
FIG. 10 is an exploded perspective view of the shock actuated responsive mechanism in accordance with the present invention.

Referring to FIGS. 8, 9 and 10, the shock actuated responsive mechanism 125 includes a weight or mass 136, such as a metal ball. When the disc valve 118 is in the open position, the ball 136 is supported on a cradle 137 which extends outwardly and away from the main body 111. The cradle 137 has a flat horizontal base plate 170 and two opposite arms 172 that extend away from the base plate 170 and attached to a vertical plate 140 which is then attached to the main body 111 by fasteners. The base plate 170 has a circular recess 139 therethrough which has contour to normally retain the ball 136 in its centered position. The ball 136 is displaceable from the centered position relative to the cradle 137, as to the position represented in broken lines in FIG. 9, by shock induced movement of the cradle 137 relative to the ball 136, during which movement the inertia of the weight resists movement thereof with the cradle 137.

A horizontal cylindrical tube or pipe 142 is disposed between the two opposite arms 172 of the cradle 137 and located adjacent to the base plate 170 and is movable in a horizontal direction relative to the cradle 137. The horizontal cylindrical tube 142 is mounted for horizontal movement by a parallelogram mechanism 143, including a projection trip arm 123, a first pair of parallel links 128 extending downwardly from the trip arm 123 and a second pair of parallel links 130 extending downwardly from the trip arm 123, each pair of links pivoted at one end of the horizontal tube 142 by a horizontal pin 145 extending through a horizontal slot 146 in the horizontal cylindrical tube 142 and secured by a pair of fasteners 126, each pair of links pivoted by a second parallel horizontal arm 147 to a pair of horizontal bracket arms 148 projecting outwardly from and attached to the vertical plate 140 and secured by a second pair of fasteners 132. The projection trip arm 123 is located above the ball 136. A horizontal movement of the horizontal cylindrical tube 142 causes a cross pin 154 to release the swing arm 120 for closure of the valve assembly 110 by seating the disc valve 118 by a spring force.

The horizontal cylindrical tube 142 is yieldingly urged outwardly by a leaf spring or plate spring 157 which is mounted to the vertical plate 140. When the ball 136 is moved laterally from its centered position in any horizontal direction relative to the cradle 137, the weight engages the outer end of the horizontal cylindrical tube 142 and displaces the horizontal tube 142 horizontally relative to the cradle 137 to move the cross pin 154 carried on the projection trip arm 123 and allows horizontal swinging movement of the projection trip arm 123 to cause the disc valve 118 to close. The amount of shock or vibration force to displace the ball 136 from the circular recess 139 is determined by the shape of the recess 139 and the mass of the ball 136. The outer end of the horizontal cylindrical tube 142 may also be beveled 164 for more controlled uniform force application by the ball 136.

The ball 136 and its associated parts are enclosed within the dome shaped housing cover 158 which is attached to and projects outwardly from the main valve body 111. Thus, the housing cover 158 effectively closes an opening 124 at the side of the main body 111. When a shock or vibration force is experienced by the shock actuated responsive mechanism 125, the ball 136 is displaced when such force reaches a specified value. If the force is of sufficient strength and duration, the ball 136 is urged upwardly and out of the circular recess 139. The ball 136 rattles around within the housing cover 158 and there is no way to know which direction the ball 136 will rattle since it is in a horizontal configuration. The ball 136 might rattle directly against the outer end of the horizontal tube 142 to trip the valve assembly 110. Alternatively, it can rattle sideways against the housing cover 158 or up, front or back against the housing cover and ricochet off the housing cover to then strike the horizontal cylindrical tube 142 to trip the valve assembly. The ball 136 can rotate 360° in any direction, and thereby hits the housing cover 158 and then ricochets off the housing cover 158 and strikes the horizontal cylindrical tube 142 to activate the valve assembly to cover the disc valve 118. The ball 136 thus automatically resets itself in the centered position when permitted to do so.

Figure 11:
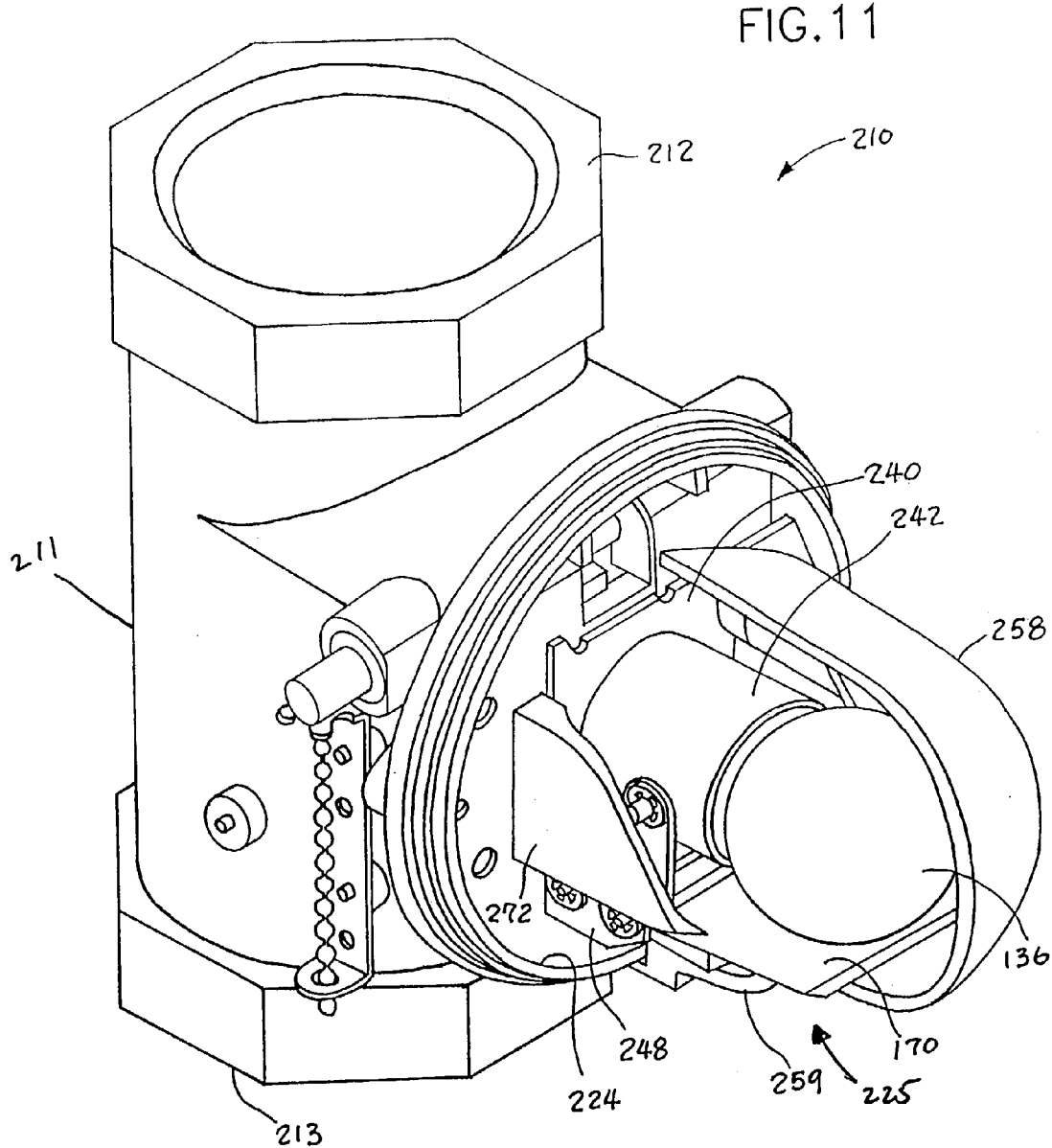
FIG. 11 is an enlarged fragmentary view of an alternative embodiment of the present invention vertical shock responsive valve assembly, showing the flow control mechanism in its open condition.
Figure 12:
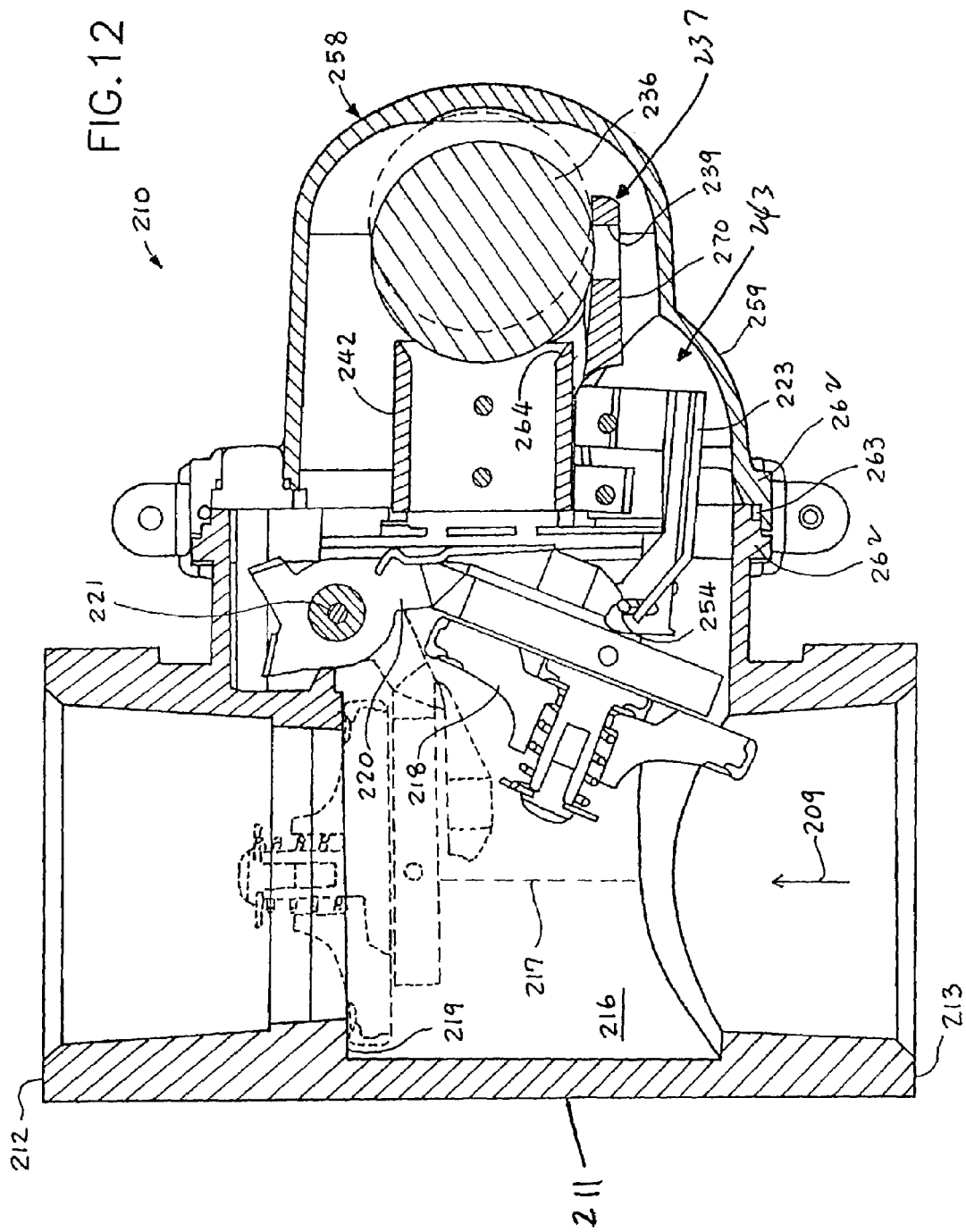
FIG. 12 is a cross-sectional view of the present invention vertical shock responsive valve assembly shown in FIG. 11, showing the flow control mechanism in dashed lines its closed condition.
Figure 13:
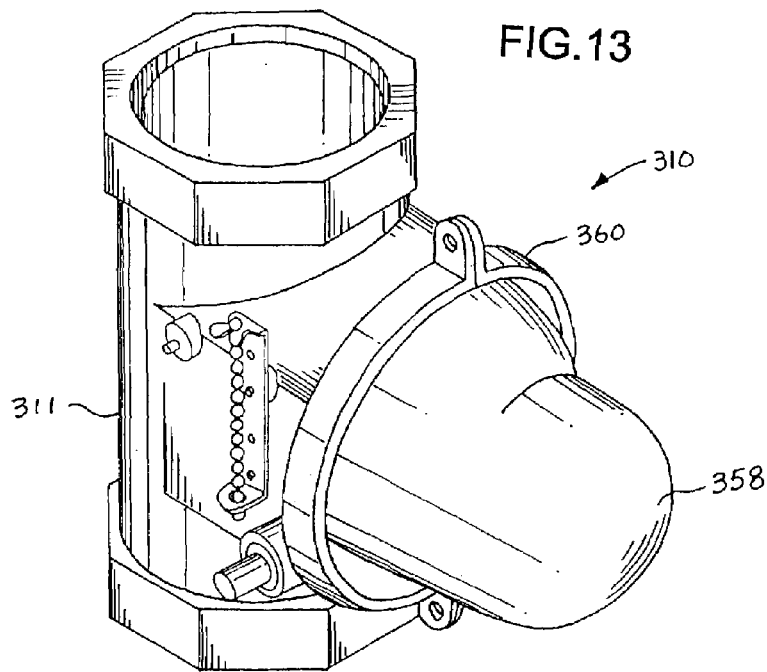
FIG. 13 is a perspective view of another alternative embodiment of the present invention of a vertical shock responsive valve assembly, where fluid flows downwardly.
Figure 14:
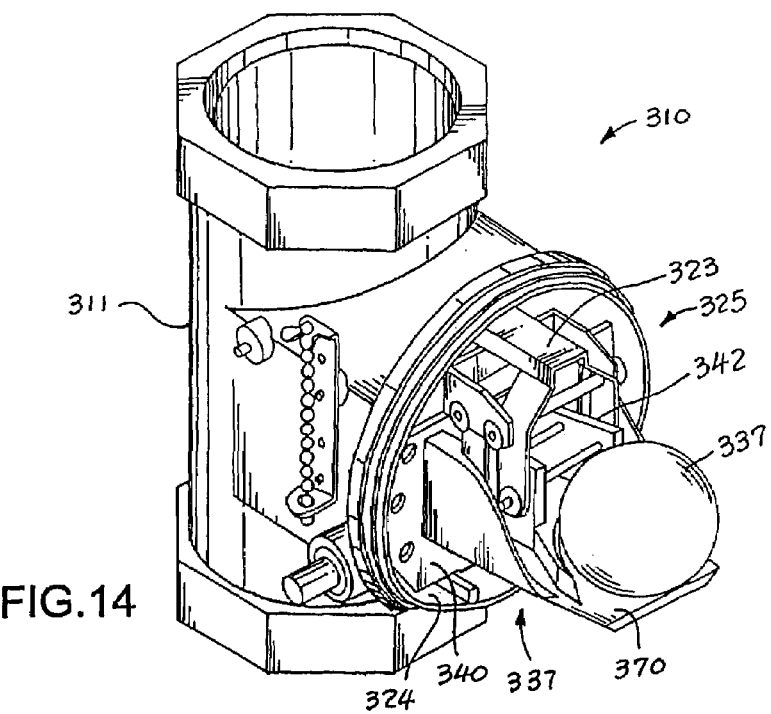
FIG. 14 is a perspective of the alternative embodiment of the present invention vertical shock responsive valve assembly illustrated in FIG. 13, without the housing cover attached.

Referring to FIG. 10, there are shown the positions of the projection trip arm 123 and the vertical plate 140 for a vertical shock and vibration force responsive valve assembly for fluid flow from bottom to top (see FIGS. 11 and 12). It will be appreciated that the positions of the projection trip arm and the vertical plate can be rotated 180° for fluid from top to bottom (see FIGS. 8 and 9).

Referring to FIGS. 11 and 12, there is shown at 210 an alternative embodiment of the present invention shock and vibration force responsive valve assembly which is adapted to automatically close off the flow of a controlled fluid such as natural gas through a conduit in response to seismic forces or other shock forces of a predetermined magnitude. This embodiment of the present invention is very similar to the embodiment just discussed above and the only difference is the nature and configuration of the projection trip arm 223 which is located underneath the ball 236 and the vertical plate 240 of the shock actuated responsive mechanism 225. All of the parts of this embodiment are correspondingly numbered in a 200 series reference number rather than a 100 series reference number used in the embodiment just discussed above arrangement.

The valve assembly 210 includes a tubular main valve body 211 having flanges 212 and 213 at its opposite ends connectable by fasteners to abutting flanges of adjacent conduit sections or pipe sections (not shown) to connect the main body 211 into a pipeline. It may be assumed that natural gas or another controlled fluid flows in an upward direction (bottom to top) as shown by the flow arrow 209 through an inner passage 216 formed in the main body 211 and parallel to a central vertical axis 217 of the inner passage 216.

The valve assembly 210 further includes a flow control mechanism which has a circular disc valve 218 engageable with an annular seat 219 formed in the main valve body 211 to close off the flow of fluid through the valve assembly 210 (see FIG. 12). The disc valve 218 is carried by a swing arm 220 which swings about a horizontal axis 221 between the closed condition (see FIG. 12) and the open condition (see FIG. 11). The arm 220 and the carried disc valve 218 are releasably retained in the open condition of the valve by engagement of the arm 220 with a latch pin 254 carried by a projection trip arm 223. The trip arm 223 is in turn releasably retained in its position by a shock responsive mechanism 225 which is contained within a dome shaped housing cover 258 having a bulge 259. The housing cover 258 is attached to the tubular main body 211 at annular flanges 262 which have a sealing O-Ring 263 or other gasket. The housing cover 258 is retained by a circular clamp 260 typically formed of two semicircular sections secured together at their opposite ends by fasteners such as screws, rivets, or other suitable fasteners.

The shock actuated responsive mechanism 225 includes a weight or mass 236, such as a metal ball. When the disc valve 218 is in the open position, the ball 236 is supported on a cradle 237 which extends outwardly and away from the main body 211. The cradle 237 has a flat horizontal base plate 270 and two opposite arms that extend away from the base plate 270 and attached to a vertical plate 240 which is then attached to the main body 211 by fasteners. The base plate 270 has a circular recess 239 therethrough which has contour to normally retain the ball 236 in its centered position. The ball 236 is displaceable from the centered position relative to the cradle 237, as to the position represented in broken lines in FIG. 12, by shock induced movement of the cradle 237 relative to the ball 236, during which movement the inertia of the weight resists movement thereof with the cradle 237.

A horizontal cylindrical tube or pipe 242 is disposed between the two opposite arms 272 of the cradle 237 and located adjacent to the base plate 270 and is movable in a horizontal direction relative to the cradle 237. The horizontal cylindrical tube 242 is mounted for horizontal movement by a parallelogram mechanism 243, including a projection trip arm 223, a first pair of parallel links extending upwardly from the trip arm 223 and a second pair of parallel links extending upwardly from the trip arm 223, each pair of links pivoted at one end of the horizontal tube 242 by a horizontal pin extending through a horizontal slot in the horizontal cylindrical tube and secured by a pair of fasteners, each pair of links pivoted by a second parallel horizontal arm to a pair of horizontal bracket arms 248 projecting outwardly from and attached to the vertical plate 240 and secured by a second pair of fasteners. A horizontal movement of the horizontal cylindrical tube 242 causes a cross pin 254 to release the swing arm 220 for closure of the valve assembly 210 by seating the disc valve 218 by a spring force.

The horizontal cylindrical tube 242 is yieldingly urged outwardly by a leaf spring or plate spring which is mounted to the vertical plate 240. When the ball 236 is moved laterally from its centered position in any horizontal direction relative to the cradle 237, the weight engages the outer end of the horizontal cylindrical tube 242 and displaces the horizontal tube 242 horizontally relative to the cradle 237 to move the cross pin 254 carried on the projection trip arm 223 and allows horizontal swinging movement of the projection trip arm 223 to cause the disc valve 218 to close. The amount of shock or vibration force to displace the ball 236 from the circular recess 239 is determined by the shape of the recess 239 and the mass of the ball 236. The outer end of the horizontal cylindrical tube 242 may also be beveled 264 for more controlled uniform force application by the ball 236.

The ball 236 and its associated parts are enclosed within the dome shaped housing cover 258 which is attached to and projects outwardly from the main valve body 211. Thus, the housing cover 258 effectively closes an opening 224 at the side of the main body 2111. When a shock or vibration force is experienced by the shock actuated responsive mechanism 225, the ball 236 is displaced when such force reaches a specified value. If the force is of sufficient strength and duration, the ball 236 is urged upwardly and out of the circular recess 239. The ball 236 rattles around within the housing cover 258 and there is no way to know which direction the ball 236 will rattle since it is in a horizontal configuration. The ball 236 might rattle directly against the outer end of the horizontal tube 242 to trip the valve assembly 210. Alternatively, it can rattle sideways against the housing cover 258 or up, front or back against the housing cover and ricochet off the housing cover to then strike the horizontal cylindrical tube 242 to trip the valve assembly. The ball 236 can rotate 360° in any direction, and thereby hits the housing cover 258 and then ricochets off the housing cover 258 and strikes the horizontal cylindrical tube 242 to activate the valve assembly to cover the disc valve 218. The ball 236 thus automatically resets itself in the centered position when permitted to do so. By way of example, only the weight or ball 136 and 236 can be made of steel.

Referring to FIGS. 13 through 16, there is shown at 310 another alternative embodiment of the present invention shock and vibration force responsive valve assembly which is adapted to automatically close off the flow of a controlled fluid such as natural gas through a conduit in response to seismic forces or other shock forces of a predetermined magnitude. The valve assembly 310 includes a tubular main valve body 311 having flanges 312 and 313 at its opposite ends connectable by fasteners to abutting flanges of adjacent conduit sections or pipe sections (not shown) to connect the main body 311 into a pipeline. It may be assumed that natural gas or another controlled fluid flows in a downward direction (top to bottom) as shown by the flow arrow 309 through an inner passage 316 formed in the main body 311 and parallel to a central vertical axis 317 of the inner passage 316.

The valve assembly 310 further includes a flow control mechanism which has a circular disc valve 318 engageable with an annular seat 319 formed in the main valve body 311 to close off the flow of fluid through the valve assembly 310 (see FIG. 9). The disc valve 318 is carried by a swing arm 320 which swings about a horizontal axis 321 between the closed condition (see FIG. 16) and the open condition (see FIG. 15). The arm 320 and the carried disc valve 318 are releasably retained in the open condition of the valve by engagement of the arm 320 with a latch pin 354 carried by a projection trip arm 323. The trip arm 323 is in turn releasably retained in its position by a shock responsive mechanism 325 which is contained within a dome shaped housing cover 358 having a bulge 359. The housing cover 358 is attached to the tubular main body 311 at annular flanges 362 which have a sealing O-Ring 363 or other gasket. The housing cover 358 is retained by a circular clamp 360 typically formed of two semicircular sections secured together at their opposite ends by fasteners such as screws, rivets, or other suitable fasteners.

Figure 15:
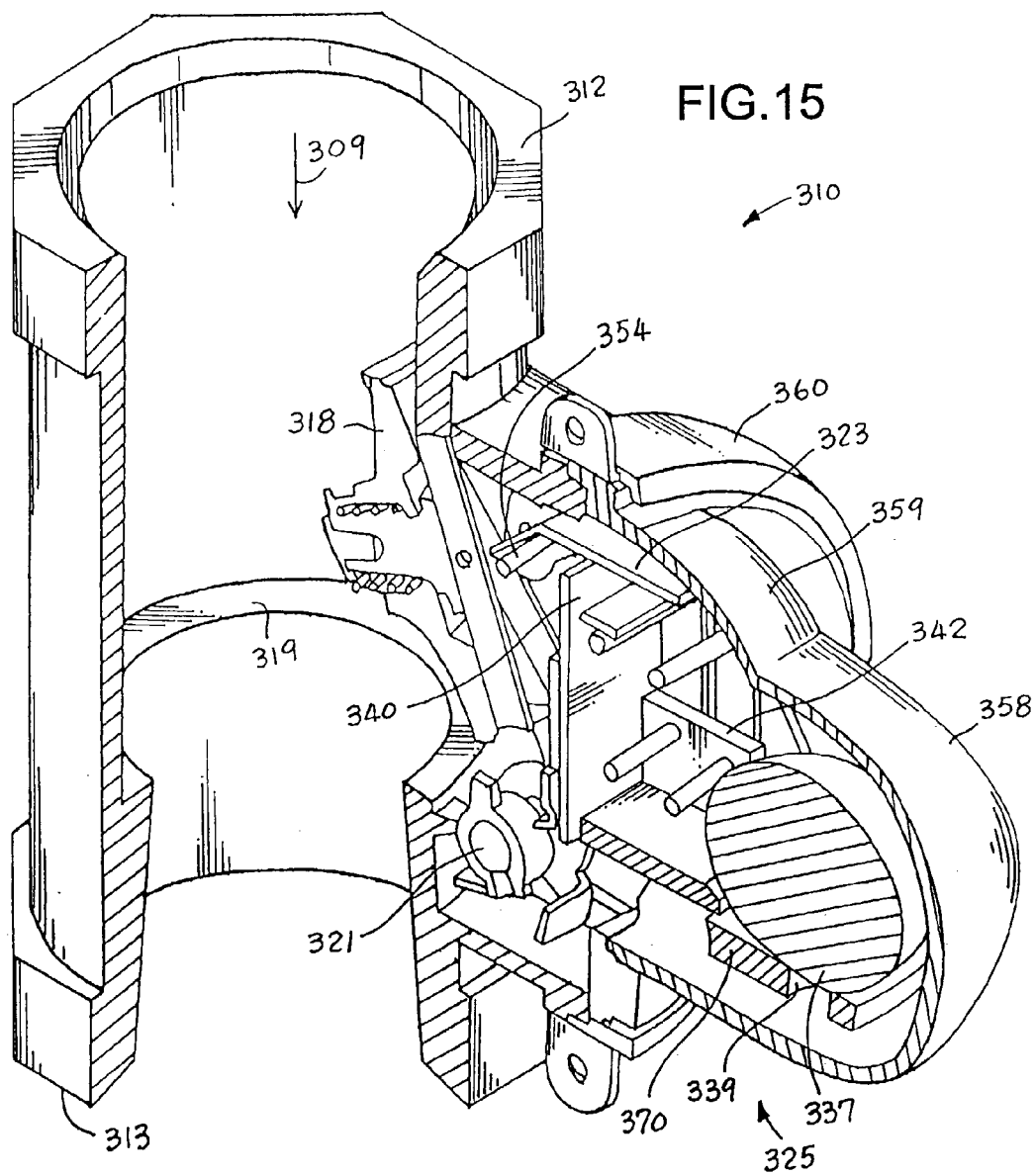
FIG. 15 is an enlarged fragmentary view of the alternative embodiment of the present invention vertical shock responsive valve assembly illustrated in FIG. 14, showing the flow control mechanism in its open condition.
Figure 16:
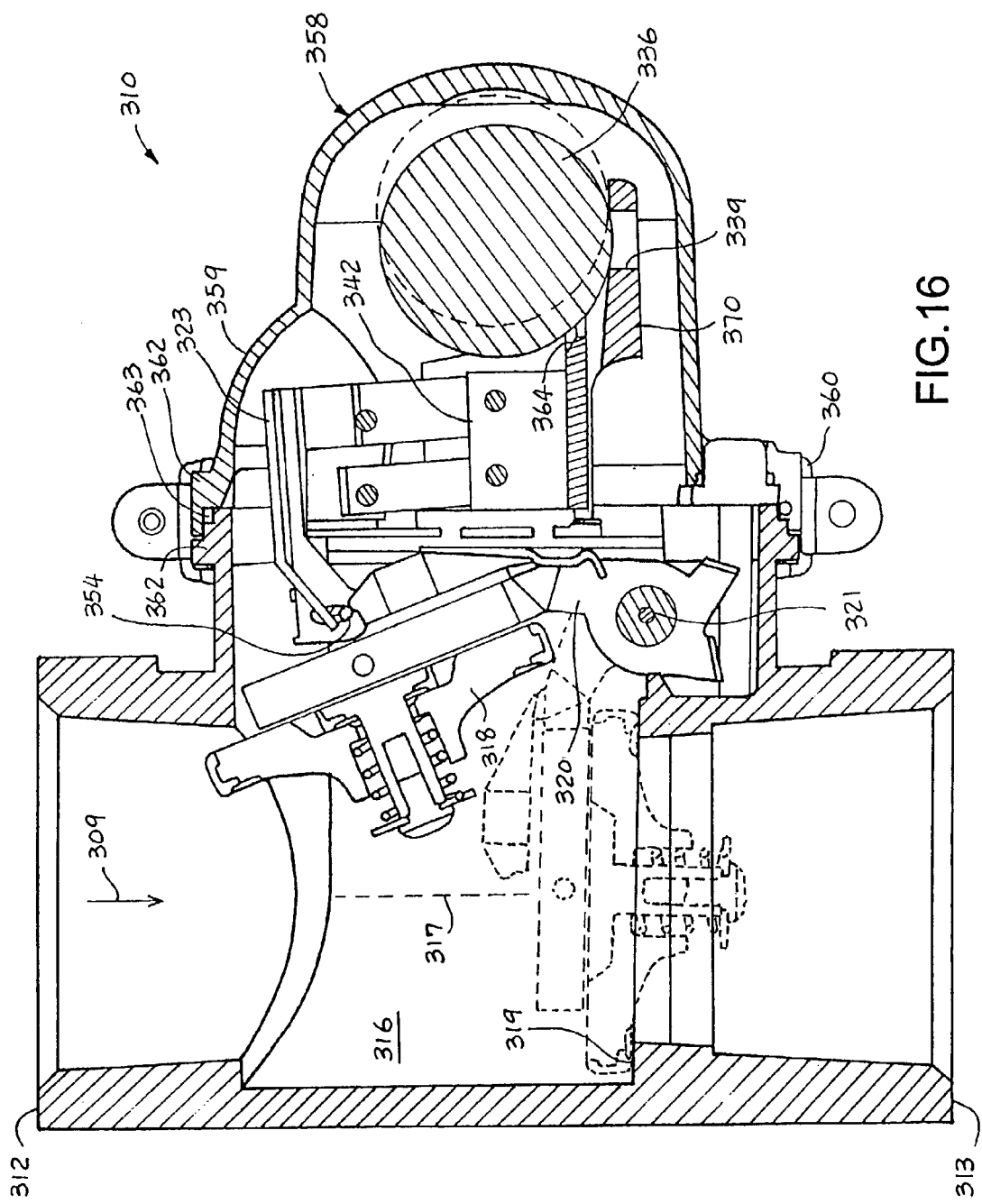
FIG. 16 is a cross-sectional view of the alternative embodiment of the present invention vertical shock responsive valve assembly illustrated in FIG. 15, showing the flow control mechanism in dashed lines in its closed condition.
Figure 17:
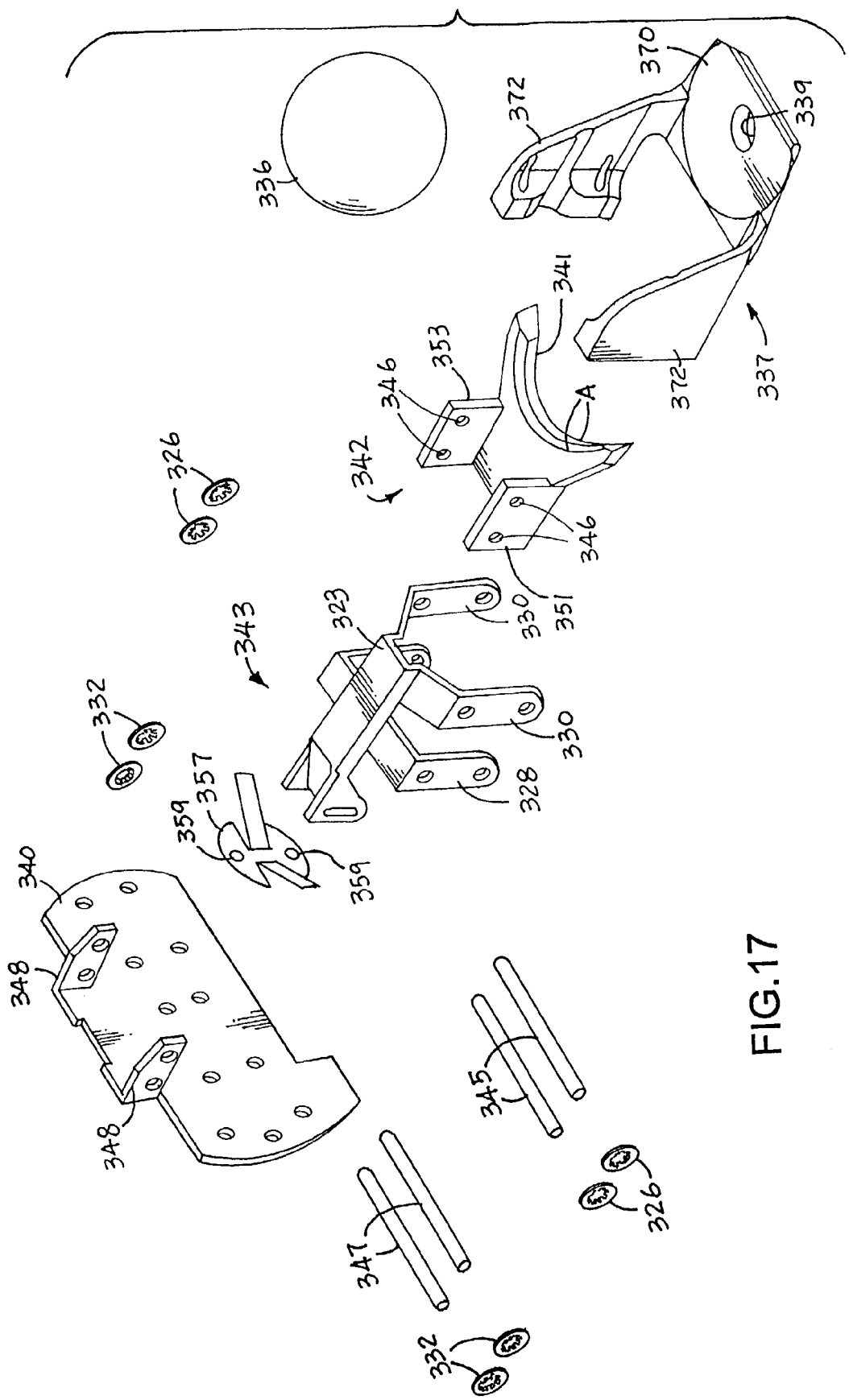
FIG. 17 is an exploded perspective view of the shock actuated responsive mechanism in accordance with the alternative embodiment of the present invention illustrated in FIG. 16.

Referring to FIGS. 15, 16 and 17, the shock actuated responsive mechanism 325 includes a weight or mass 336, such as a metal ball. When the disc valve 318 is in the open position, the ball 336 is supported on a cradle 337 which extends outwardly and away from the main body 311. The cradle 337 has a flat horizontal base plate 370 and two opposite arms 372 that extend away from the base plate 370 and attached to a vertical plate 340 which is then attached to the main body 311 by fasteners. The base plate 370 has a circular recess 339 therethrough which has contour to normally retain the ball 336 in its centered position. The ball 336 is displaceable from the centered position relative to the cradle 337, as to the position represented in broken lines in FIG. 16, by shock induced movement of the cradle 337 relative to the ball 336, during which movement the inertia of the weight resists movement thereof with the cradle 337.

A trip fork mechanism 342 is disposed between the two opposite arms 372 of the cradle 337 and located adjacent to the base plate 370 and is movable in a horizontal direction relative to the cradle 337. The trip fork 342 comprises a semicircular base member 341 which is contoured at an angle "A" relative to the horizontal. The angle "A" is preferably 45 degrees although any angle from 15 degrees to 75 degrees will function with the alternative embodiment of the present invention. The trip fork 342 further comprises a pair of spaced apart parallel vertical walls 351 and 353 having openings 346 therethrough. The trip fork mechanism 342 is mounted for horizontal movement by a movable mechanism which by way of example is a parallelogram mechanism 343, including a projection trip arm 323, a first pair of parallel links 328 extending downwardly from the trip arm 323 and a second pair of parallel links 330 extending downwardly from the trip arm 323, each pair of links pivoted on the vertical walls 351 and 353 of the trip fork mechanism 342 by a horizontal pin 345 extending through the horizontal openings 346 in the vertical walls 351 and 353 of the trip fork mechanism 342 and secured by a pair of fasteners 326, each pair of links pivoted by a second parallel horizontal arm 347 to a pair of horizontal bracket arms 348 projecting outwardly from and attached to the vertical plate 340 and secured by a second pair of fasteners 332. The projection trip arm 323 is located above the ball 336. A horizontal movement of the trip fork mechanism 342 causes a cross pin 354 to release the swing arm 320 for closure of the valve assembly 310 by seating the disc valve 318 by a spring force.

The trip fork mechanism 342 is yieldingly urged outwardly by a leaf spring or plate spring 357 which is mounted to the vertical plate 340 by rivets 359. When the ball 336 is moved laterally from its centered position in any horizontal direction relative to the cradle 337, the weight engages the base member 341 of the trip fork mechanism 342 and the contoured surfaced of the base member 341 enables both the weight and acceleration of the ball 336 to act on the trip fork mechanism 342 to cause the trip fork mechanism to be displaced in a horizontal direction and thereby move the cross pin 354 carried on the projection trip arm 323 and allows horizontal swinging movement of the projection trip arm 323 to cause the disk valve 318 to close. The amount of shock or vibration force to displace the ball 336 from the circular recess 339 is determined by the shape of the recess 339 and the mass of the ball 336. As illustrated in FIG. 16, there is a gap between the horizontal base 341 of trip fork mechanism 342 and the ball 336 and the semicircular shape of the contoured horizontal base 341 further facilitates action of the ball 336 to hit the trip fork mechanism 342. The contoured angle "A" preferably at 45 degrees further facilitates activation of the trip fork mechanism 342 by both the acceleration and weight of the ball 336 coming in contact with the contoured surface set at an angle "A" of base mechanism 341.

The ball 336 and its associated parts are enclosed within the dome shaped housing cover 358 which is attached to and projects outwardly from the main valve body 311. Thus, the housing cover 358 effectively closes an opening 324 at the side of the main body 311. When a shock or vibration force is experienced by the shock actuated responsive mechanism 325, the ball 336 is displaced when such force reaches a specified value. If the force is of sufficient strength and duration, the ball 336 is urged upwardly and out of the circular recess 339. The ball 336 rattles around within the housing cover 358 and there is no way to know which direction the ball 336 will rattle since it is in a horizontal configuration. The ball 336 might rattle directly against the base member 341 of the trip fork mechanism 342 to trip the valve assembly 310. Alternatively, it can rattle sideways against the housing cover 358 or up, front or back against the housing cover and ricochet off the housing cover to then strike the base member 341 of trip fork mechanism 342 to trip the valve assembly. The ball 336 can rotate 360° in any direction, and thereby hits the housing cover 358 and then-ricochets off the housing cover 358 and strikes the trip fork mechanism 342 to activate the valve assembly to cover the disc valve 318. The ball 336 thus automatically resets itself in the centered position when permitted to do so.

Figure 18:
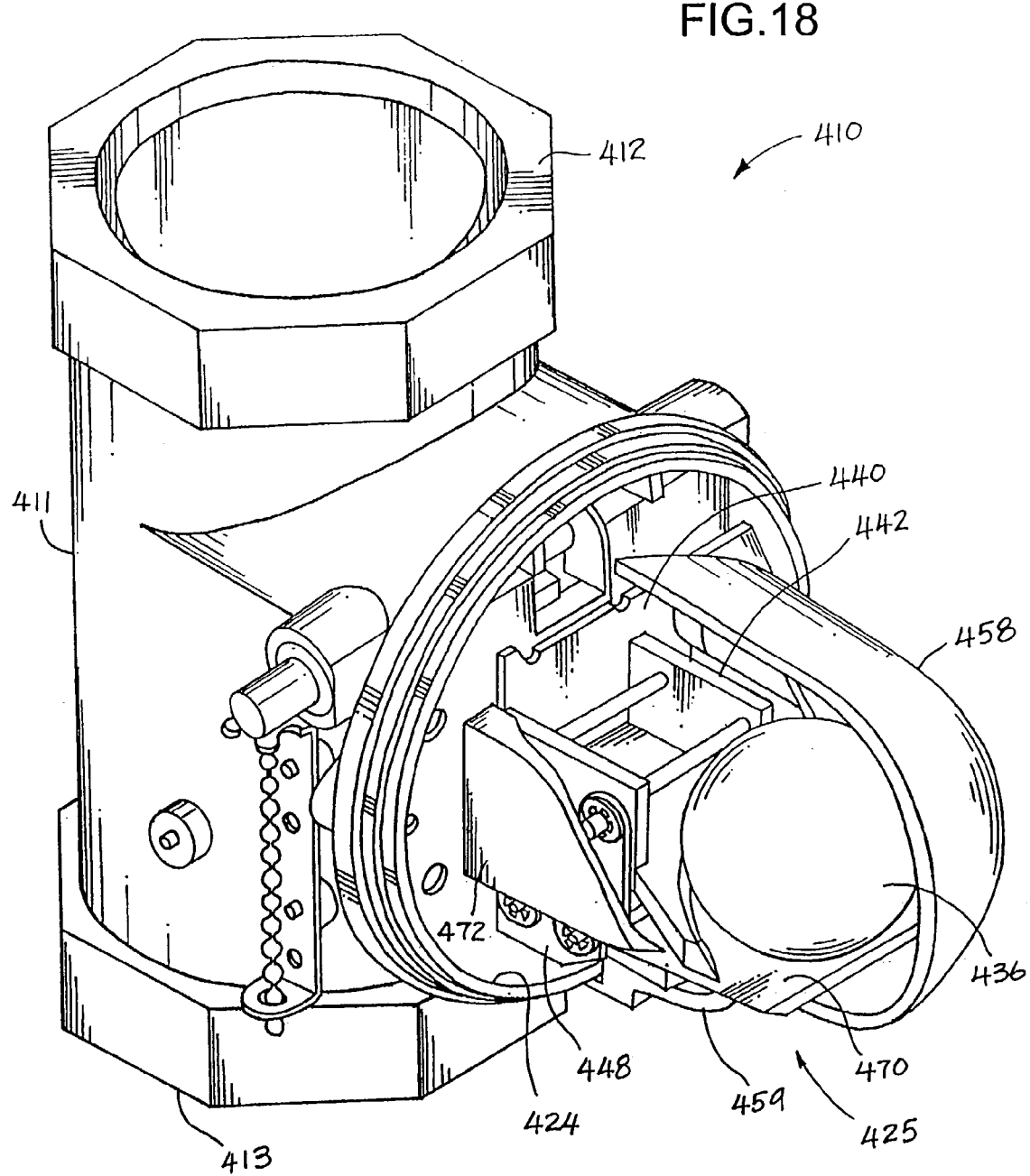
FIG. 18 is perspective view of a variation of the alternative embodiment of the present invention vertical shock responsive valve assembly, showing the flow control mechanism in its open condition where fluid flows upwardly.
Figure 19:
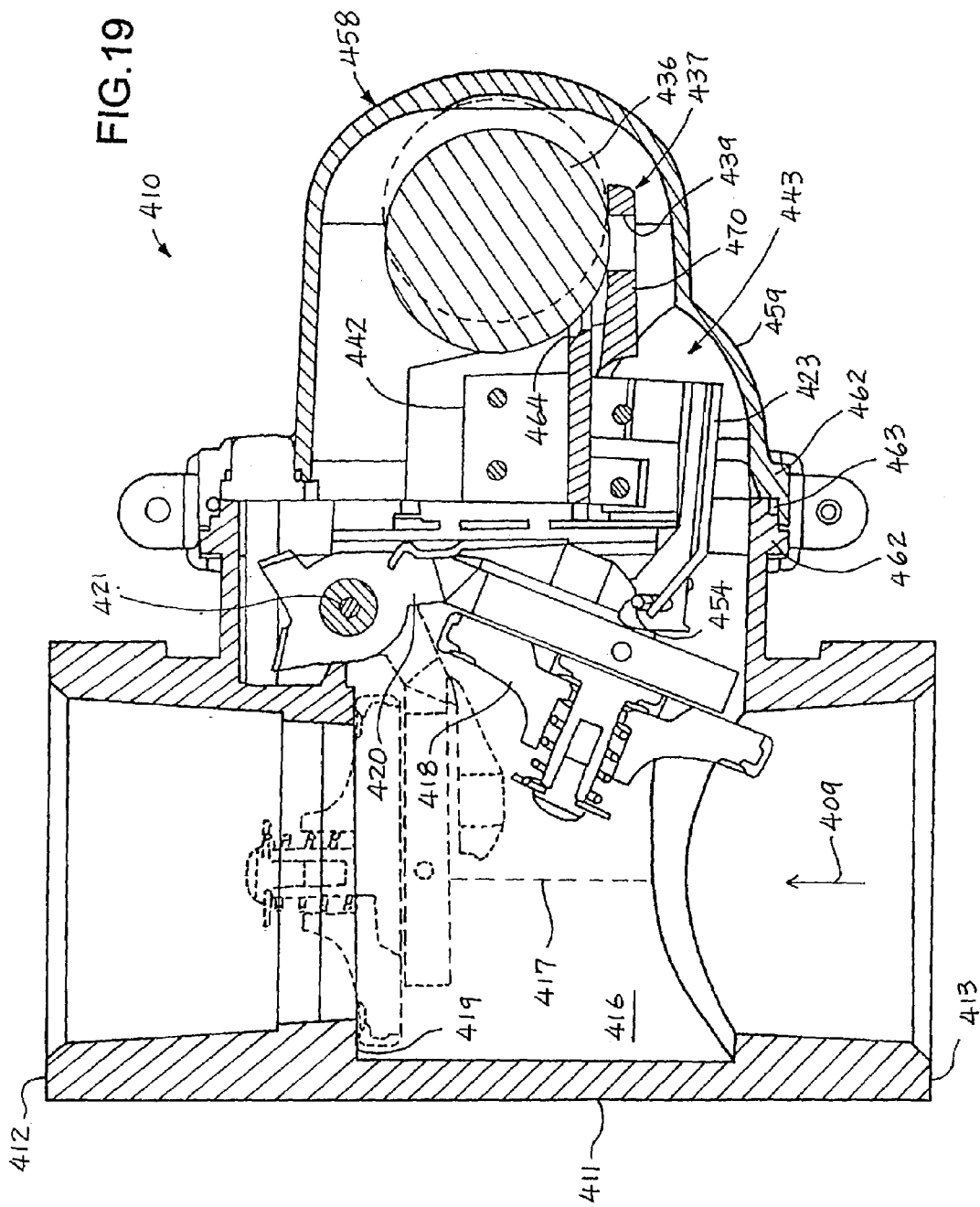
FIG. 19 is a cross-sectional view of the variation of the alternative embodiment of the present invention vertical shock responsive valve assembly shown in FIG. 18, showing the flow control mechanism in dashed lines its closed condition.
Figure 20:
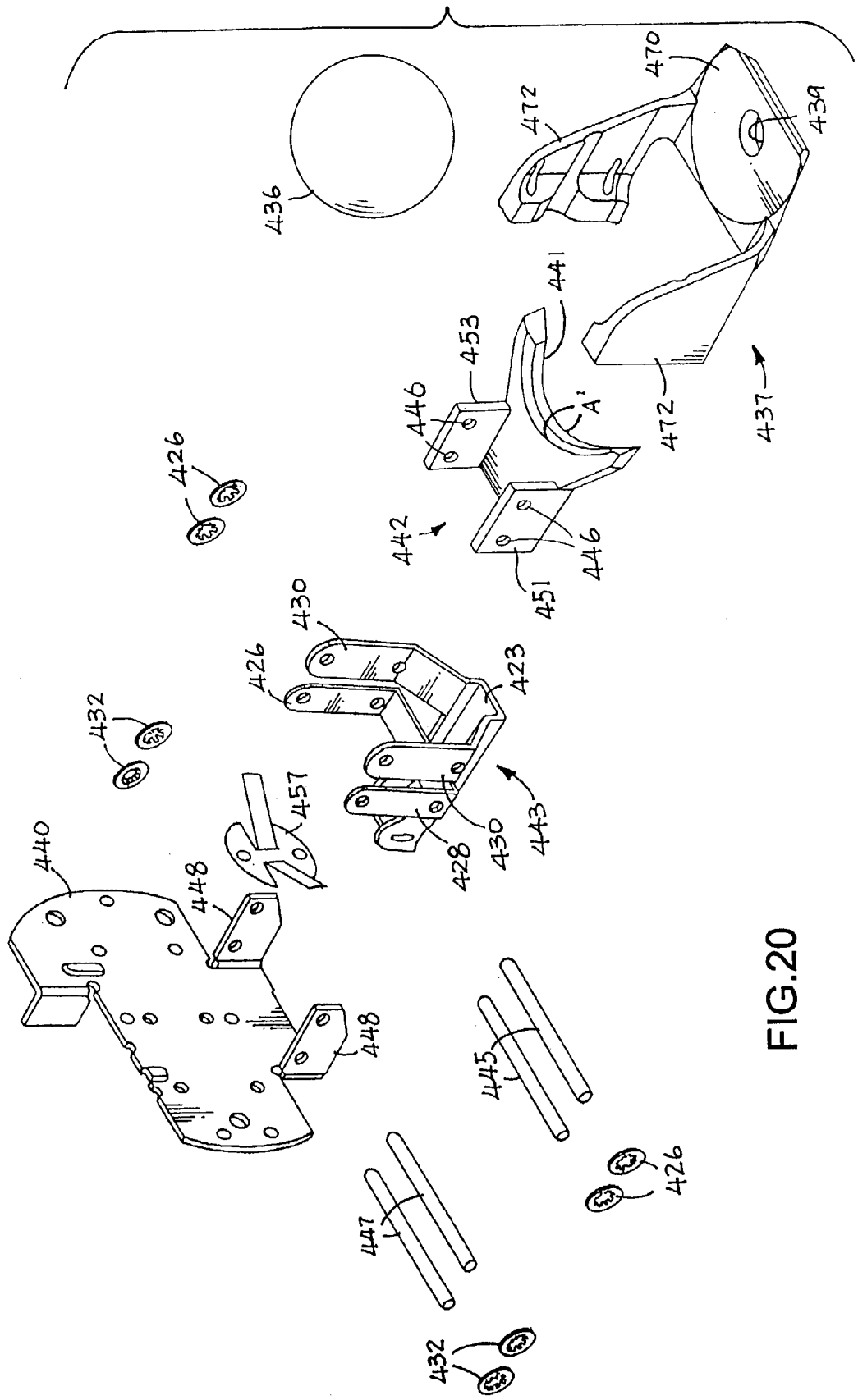
FIG. 20 is an exploded perspective view of the shock actuated responsive mechanism in accordance with the alternative embodiment of the present invention illustrated in FIG. 19.

Referring to FIGS. 18, 19 and 20, there is shown at 410 an alternative embodiment of the present invention shock and vibration force responsive valve assembly which is adapted to automatically close off the flow of a controlled fluid such as natural gas through a conduit in response to seismic forces or other shock forces of a predetermined magnitude. This embodiment of the present invention is very similar to the embodiment just discussed above and the only difference is the nature and configuration of the projection trip arm 423 which is located underneath the ball 436 and the vertical plate 440 of the shock actuated responsive mechanism 425. All of the parts of this embodiment are correspondingly numbered in a 400 series reference number rather than a 300 series reference number used in the embodiment just discussed above.

The valve assembly 410 includes a tubular main valve body 411 having flanges 412 and 413 at its opposite ends connectable by fasteners to abutting flanges of adjacent conduit sections or pipe sections (not shown) to connect the main body 411 into a pipeline. It may be assumed that natural gas or another controlled fluid flows in an upward direction (bottom to top) as shown by the flow arrow 409 through an inner passage 416 formed in the main body 411 and parallel to a central vertical axis 417 of the inner passage 416.

The valve assembly 410 further includes a flow control mechanism which has a circular disc valve 418 engageable with an annular seat 419 formed in the main valve body 411 to close off the flow of fluid through the valve assembly 410 (see FIG. 19). The disc valve 418 is carried by a swing arm 420 which swings about a horizontal axis 421 between the closed condition (see FIG. 19) and the open condition (see FIG. 18). The arm 420 and the carried disc valve 418 are releasably retained in the open condition of the valve by engagement of the arm 420 with a latch pin 454 carried by a projection trip arm 423. The trip arm 423 is in turn releasably retained in its position by a shock responsive mechanism 425 which is contained within a dome shaped housing cover 458 having a bulge. The housing cover 458 is attached to the tubular main body 411 at annular flanges 462 which have a sealing O-Ring 463 or other gasket. The housing cover 458 is retained by a circular clamp typically formed of two semicircular sections secured together at their opposite ends by fasteners such as screws, rivets, or other suitable fasteners.

The shock actuated responsive mechanism 425 includes a weight or mass 436, such as a metal ball. When the disc valve 418 is in the open position, the ball 436 is supported on a cradle 437 which extends outwardly and away from the main body 411. The cradle 437 has a flat horizontal base plate 470 and two opposite arms that extend away from the base plate 470 and attach to a vertical plate 440 which is then attached to the main body 411 by fasteners. The base plate 470 has a circular recess 439 therethrough which has contour to normally retain the ball 436 in its centered position. The ball 436 is displaceable from the centered position relative to the cradle 437, as to the position represented in broken lines in FIG. 19, by shock induced movement of the cradle 437 relative to the ball 436, during which movement the inertia of the weight resists movement thereof with the cradle 437.

A trip fork mechanism 442 is disposed between the two opposite arms 472 of the cradle 437 and located adjacent to the base plate 470 and is movable in a horizontal direction relative to the cradle 437. The trip fork mechanism 442 comprises a semicircular base member 441 which is contoured at an angle "$A^1$" relative to the horizontal. The angle "$A^1$" is preferably 45 degrees although any angle from 15 degrees to 75 degrees will function with the alternative embodiment of the present invention. The trip fork mechanism 442 further comprises a pair of spaced apart parallel vertical walls 451 and 453 having openings 446 therethrough.

Referring to FIG. 20, the trip fork mechanism 442 is mounted for horizontal movement by a movable mechanism which by way of example is a parallelogram mechanism 443 including a projection trip arm 423, a first pair of parallel links 426 and 428 extending upwardly from the trip arm 423 and a second pair of parallel links 430 extending upwardly from the trip arm 423, each pair of links respectively pivoted at one end vertical walls 451 and 453 by a horizontal pins 445 extending through the horizontal openings 446 and secured by a pair of fasteners 426, each pair of links pivoted by a second pair of pins 447 to a pair of horizontal bracket arms 448 projecting outwardly from and attached to the vertical plate 440 and secured by a second pair of fasteners 432. A horizontal movement of the trip fork mechanism 442 causes a cross pin 454 to release the swing arm 420 for closure of the valve assembly 410 by seating the disc valve 418 by a spring force.

The trip fork mechanism 446 is yieldingly urged outwardly by a leaf spring or plate spring 457 which is mounted by rivets to the vertical plate 440. When the ball 436 is moved laterally from its centered position in any horizontal direction relative to the cradle 437, the weight engages the semicircular base member 441 of trip fork mechanism 442 and the angle "$A^1$" further enables the inertia as well as the weight of the ball to act upon the ball 436 to act upon the trip fork mechanism 446 and causes the trip fork mechanism 442 to move horizontally relative to the cradle 437 and move the cross pin 454 carried on the projection trip arm 423 and allows horizontal swinging movement of the projection trip arm 423 to cause the disc valve 418 to close. The amount of shock or vibration force to displace the ball 436 from the circular recess 439 is determined by the shape of the recess 439 and the mass of the ball 436.

The ball 436 and its associated parts are enclosed within the dome shaped housing cover 458 which is attached to and projects outwardly from the main valve body 411. Thus, the housing cover 458 effectively closes an opening 424 at the side of the main body 411. When a shock or vibration force is experienced by the shock actuated responsive mechanism 425, the ball 436 is displaced when such force reaches a specified value. If the force is of sufficient strength and duration, the ball 436 is urged upwardly and out of the circular recess 439. The ball 436 rattles around within the housing cover 458 and there is no way to know which direction the ball 436 will rattle since it is in a horizontal configuration. The ball 436 might rattle directly against the ball member 441 of trip fork mechanism 442 to trip the valve assembly 410. Alternatively, it can rattle sideways against the housing cover 458 or up, front or back against the housing cover and ricochet off the housing cover to then strike the trip fork mechanism 442 to trip the valve assembly. The ball 436 can rotate 360° in any direction, and thereby hits the housing cover 458 and then ricochets off the housing cover 458 and strikes the trip fork mechanism 442 to activate the valve assembly to cover the disc valve 418. The ball 436 thus automatically resets itself in the centered position when permitted to do so. By way of example, only the weight or ball 436 can be made of steel.

Figure 21:
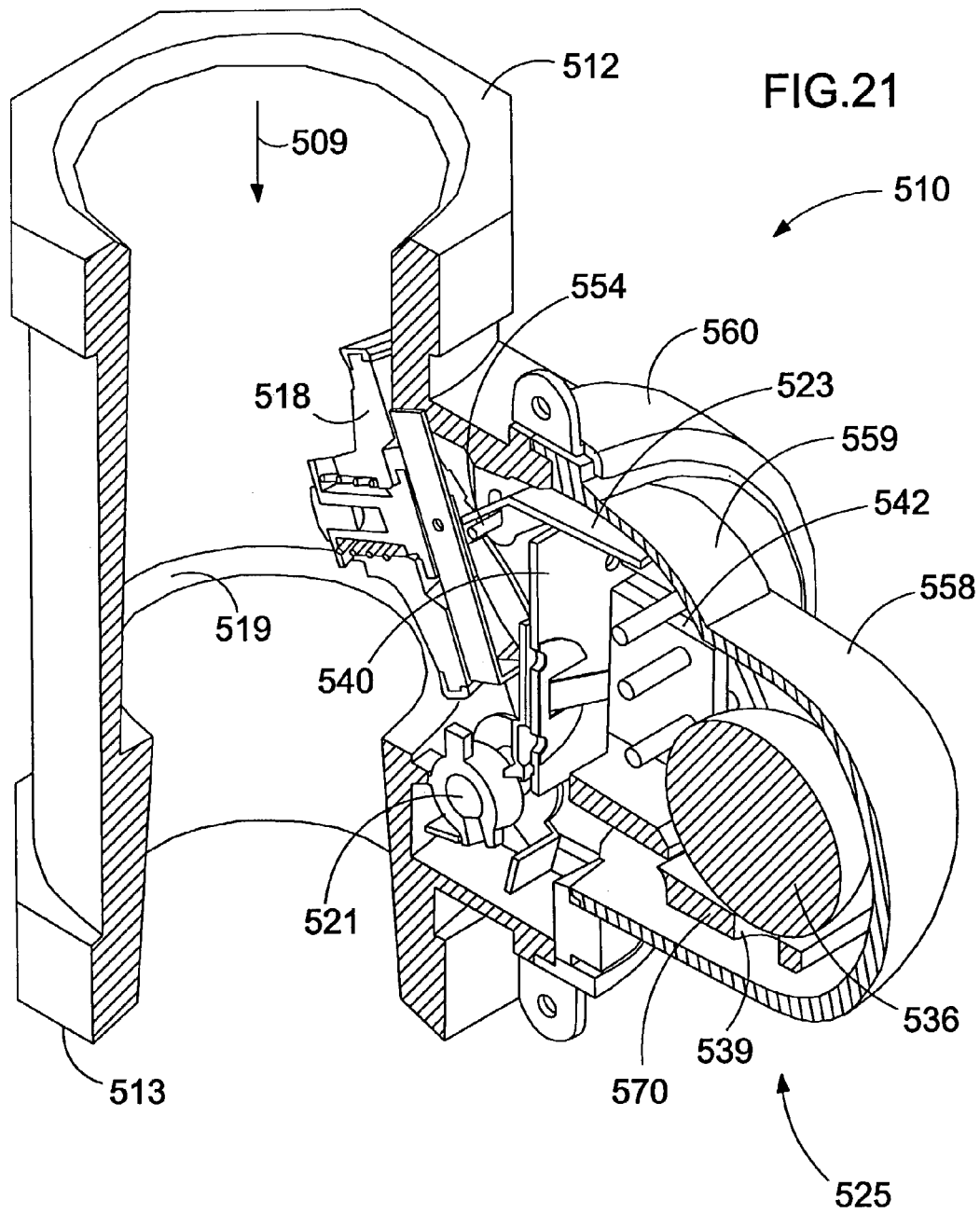
FIG. 21 is an enlarged fragmentary view of another alternative embodiment of the present invention vertical shock responsive valve assembly with an improved leveraged valve closing actuation means, showing the flow control mechanism in its open condition.
Figure 22:
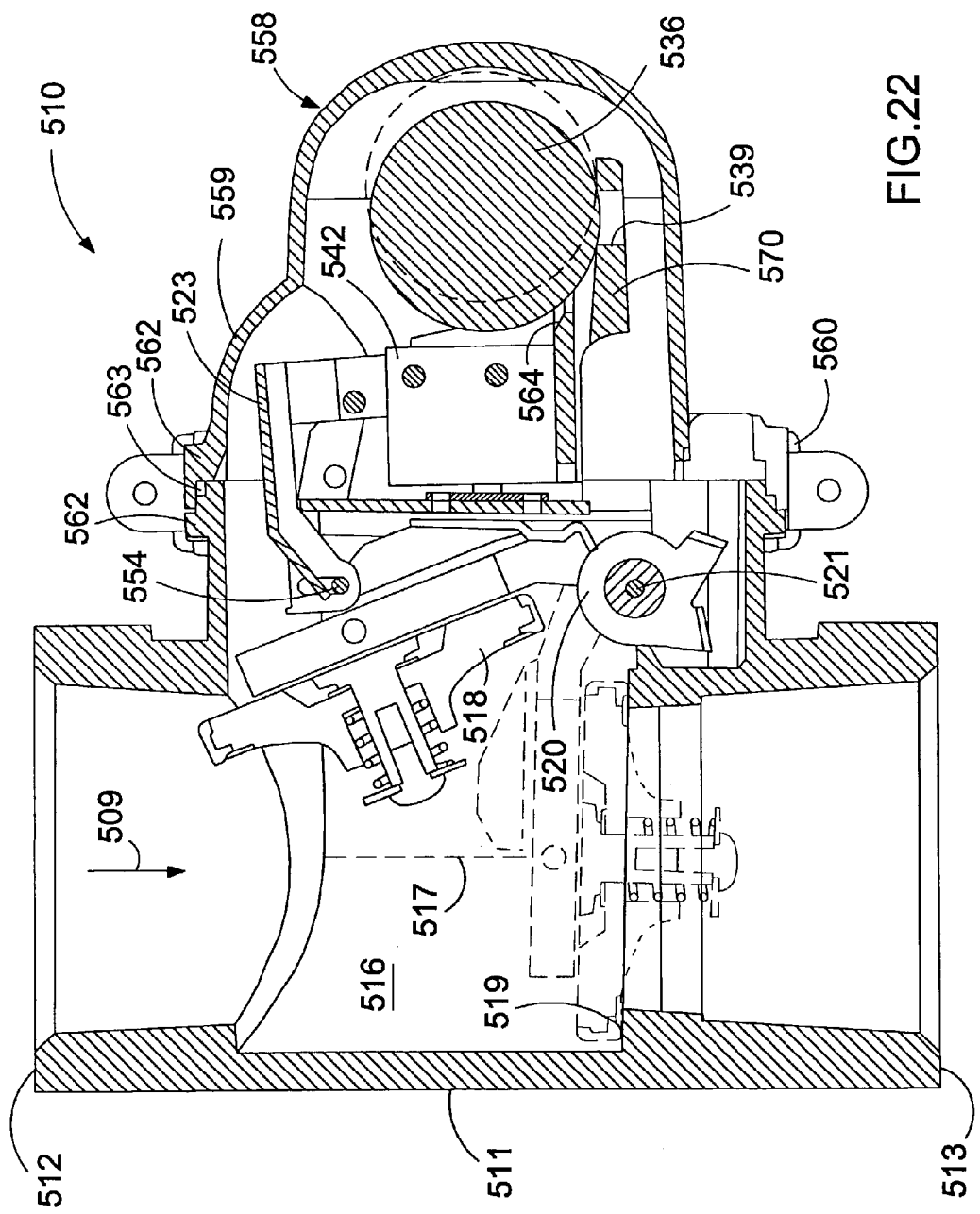
FIG. 22 is a cross-sectional view of another alternative embodiment of the present invention vertical shock responsive valve assembly with an improved leveraged valve closing actuation means, showing the flow control mechanism in dashed lines in its closed condition.
Figure 23:
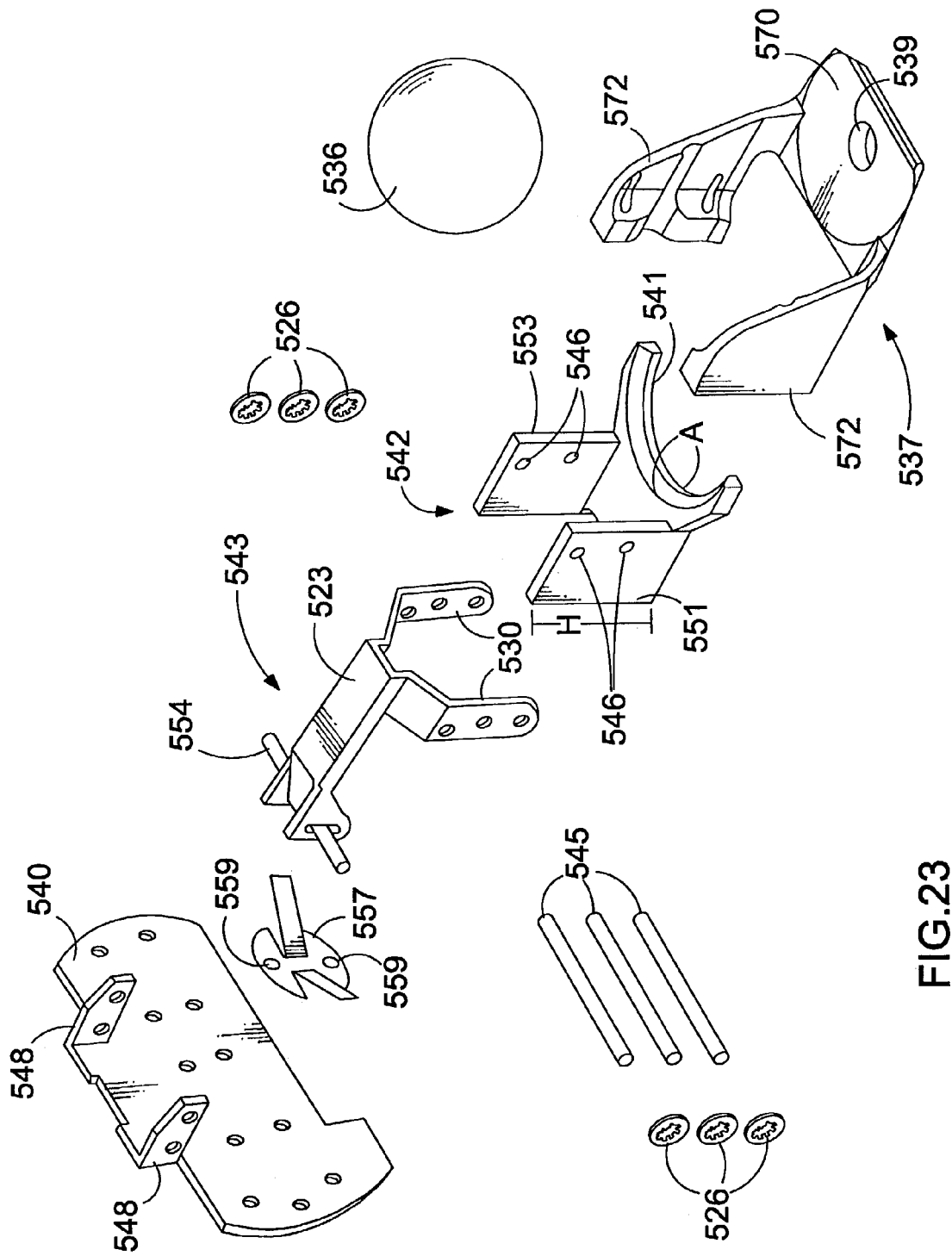
FIG. 23 is an exploded perspective view of the shock actuated responsive mechanism having the improved leveraged valve closing actuation means in accordance with the alternative embodiment of the present invention illustrated in FIGS. 21 and 22.

Referring to FIGS. 21 through 23, there is shown at 510 another alternative embodiment of the present invention shock and vibration force responsive valve assembly with an improved leveraged valve closing actuation means, which is adapted to automatically close off the flow of a controlled fluid such as natural gas through a conduit in response to seismic forces or other shock forces of a predetermined magnitude. The valve assembly 510 includes a tubular main valve body 511 having flanges 512 and 513 at its opposite ends connectable by fasteners to abutting flanges of adjacent conduit sections or pipe sections (not shown) to connect the main body 511 into a pipeline. It may be assumed that natural gas or another controlled fluid flows in a downward direction (top to bottom) as shown by the flow arrow 509 through an inner passage 516 formed in the main body 511 and parallel to a central vertical axis 517 of the inner passage 516.

The valve assembly 510 further includes a flow control mechanism which has a circular disc valve 518 engageable with an annular seat 519 formed in the main valve body 511 to close off the flow of fluid through the valve assembly 510. The disc valve 518 is carried by a swing arm 520 which swings about a horizontal axis 521 between the closed condition (see FIG. 22) and the open condition (see FIG. 21). The arm 520 and the carried disc valve 518 are releasably retained in the open condition of the valve by engagement of the arm 520 with a latch pin 554 carried by a projection trip arm 523. The trip arm 523 is in turn releasably retained in its position by a shock responsive mechanism 525 which is contained within a dome shaped housing cover 558 having a bulge 559. The housing cover 558 is attached to the tubular main body 511 at annular flanges 562 which have a sealing O-Ring 563 or other gasket. The housing cover 558 is retained by a circular clamp 560 typically formed of two semicircular sections secured together at their opposite ends by fasteners such as screws, rivets, or other suitable fasteners.

Referring to FIGS. 21, 22 and 23, the shock actuated responsive mechanism 525 includes a weight or mass 536, such as a metal ball. When the disc valve 518 is in the open position, the ball 536 is supported on a cradle 537 which extends outwardly and away from the main body 511. The cradle 537 has a flat horizontal base plate 570 and two opposite arms 572 that extend away from the base plate 570 and attached to a vertical plate 540 which is then attached to the main body 511 by fasteners. The base plate 570 has a circular recess 539 therethrough which has contour to normally retain the ball 536 in its centered position. The ball 536 is displaceable from the centered position relative to the cradle 537, as to the position represented in broken lines in FIG. 22, by shock induced movement of the cradle 537 relative to the ball 536, during which movement the inertia of the weight resists movement thereof with the cradle 537.

A trip fork mechanism 542 is disposed between the two opposite arms 572 of the cradle 537 and located adjacent to the base plate 570 and is movable in a horizontal direction relative to the cradle 537. The trip fork 542 comprises a semicircular base member 541 which is contoured at an angle "A" relative to the horizontal. The angle "A" is preferably 45 degrees although any angle from 15 degrees to 75 degrees will function with the alternative embodiment of the present invention. The trip fork 542 further comprises a pair of spaced apart parallel vertical walls 551 and 553 having two openings 346 in each of the vertical walls. The improvement in the present invention involves doubling the height H of the vertical walls 551 and 553. The new design increases the leverage of the force so it reduces the required weight of the ball to produce the same force as with the immediately previous alternative design. By using a ball of the same weight, the inertia force is increased because of the increased leverage of the action of the ball 536 against the semicircular base member 541 having an impact on the vertical walls 551 and 553 which doubles the leverage in view of the fact that the height of the vertical wall is increased. The trip fork mechanism 542 is mounted for horizontal movement by a movable mechanism 543, including a projection trip arm 523, and a pair of parallel links 530 extending downwardly from the trip arm 523, the pair of links pivoted on the vertical walls 551 and 553 of the trip fork mechanism 542 by horizontal pins 545 extending through the horizontal openings 546 in the vertical walls 551 and 553 of the trip fork mechanism 542 and secured by a pair of fasteners 526. The second set of parallel links illustrated in FIG. 17 of the previous embodiment is not necessary in this alternative embodiment. The concept of the present invention improvement is that the lower two sets of horizontal pins extend through openings 546 in elongated vertical walls 551 and 553 to attach the longer vertical wall to the one set of parallel links 530 and by having this increased height, the leverage of the action of the ball 536 against the semicircular base member 541 increases the force so that the inertial force of action to close the valve is increased because of the increased leverage due to the increased vertical height of walls 551 and 553. The projection trip arm 523 is located above the ball 536. A horizontal movement of the trip fork mechanism 542 causes a cross pin 554 to release the swing arm 520 for closure of the valve assembly 510 by seating the disc valve 518 by a spring force.

The trip fork mechanism 542 is yieldingly urged outwardly by a leaf spring or plate spring 557 which is mounted to the vertical plate 540 by rivets 559. When the ball 536 is moved laterally from its centered position in any horizontal direction relative to the cradle 537, the weight engages the base member 541 of the trip fork mechanism 542 and the contoured surfaced of the base member 541 enables both the weight and acceleration of the ball 536 to act on the trip fork mechanism 542 to cause the trip fork mechanism to be displaced in a horizontal direction and thereby move the cross pin 554 carried on the projection trip arm 523 and allows horizontal swinging movement of the projection trip arm 523 to cause the disk valve 518 to close. The amount of shock or vibration force to displace the ball 536 from the circular recess 539 is determined by the shape of the recess 539 and the mass of the ball 536. As illustrated in FIG. 22, there is a gap between the horizontal base 541 of trip fork mechanism 542 and the ball 536 and the semicircular shape of the contoured horizontal base 541 further facilitates action of the ball 536 to hit the trip fork mechanism 542. The contoured angle "A" preferably at 45 degrees further facilitates activation of the trip fork mechanism 542 by both the acceleration and weight of the ball 536 coming in contact with the contoured surface set at an angle "A" of base mechanism 541.

The ball 536 and its associated parts are enclosed within the dome shaped housing cover 558 which is attached to and projects outwardly from the main valve body 511. Thus, the housing cover 558 effectively closes an opening 524 at the side of the main body 511. When a shock or vibration force is experienced by the shock actuated responsive mechanism 525, the ball 536 is displaced when such force reaches a specified value. If the force is of sufficient strength and duration, the ball 536 is urged upwardly and out of the circular recess 539. The ball 536 rattles around within the housing cover 558 and there is no way to know which direction the ball 536 will rattle since it is in a horizontal configuration. The ball 536 might rattle directly against the base member 541 of the trip fork mechanism 542 to trip the valve assembly 510. Alternatively, it can rattle sideways against the housing cover 558 or up, front or back against the housing cover and ricochet off the housing cover to then strike the base member 541 of trip fork mechanism 542 to trip the valve assembly. The ball 536 can rotate 360° in any direction, and thereby hits the housing cover 558 and then ricochets off the housing cover 558 and strikes the trip fork mechanism 542 to activate the valve assembly to cover the disc valve 518. The ball 536 thus automatically resets itself in the centered position when permitted to do so.

Figure 24:
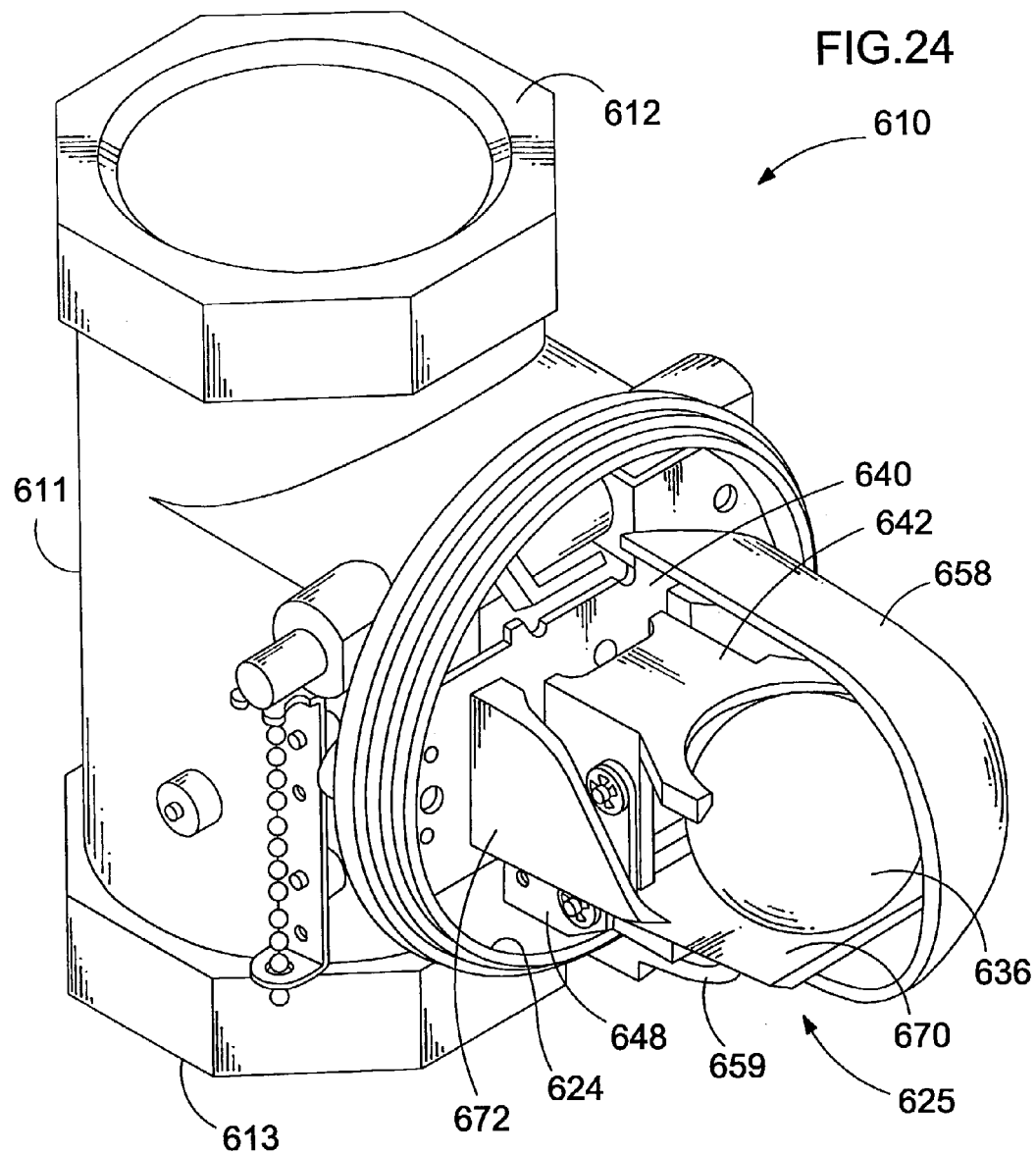
FIG. 24 is perspective view of a variation of another alternative embodiment of the present invention vertical shock responsive valve assembly with an improved leveraged valve closing actuation means, showing the flow control mechanism in its open condition where fluid flows upwardly.
Figure 25:
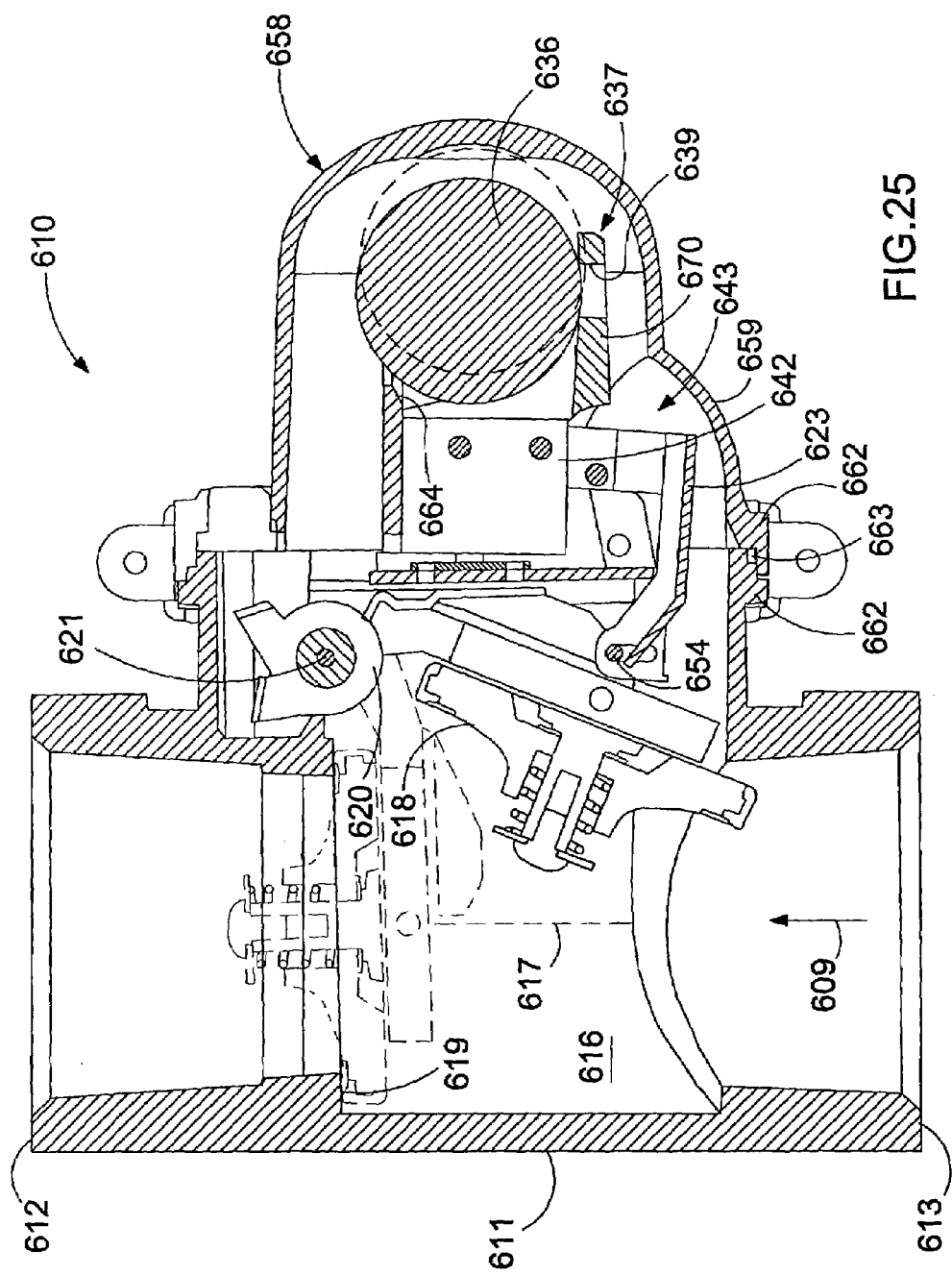
FIG. 25 is a cross-sectional view of the variation of the other alternative embodiment of the present invention vertical shock responsive valve assembly with an improved leveraged valve closing actuation means, showing the flow control mechanism in dashed lines in its closed condition.
Figure 26:
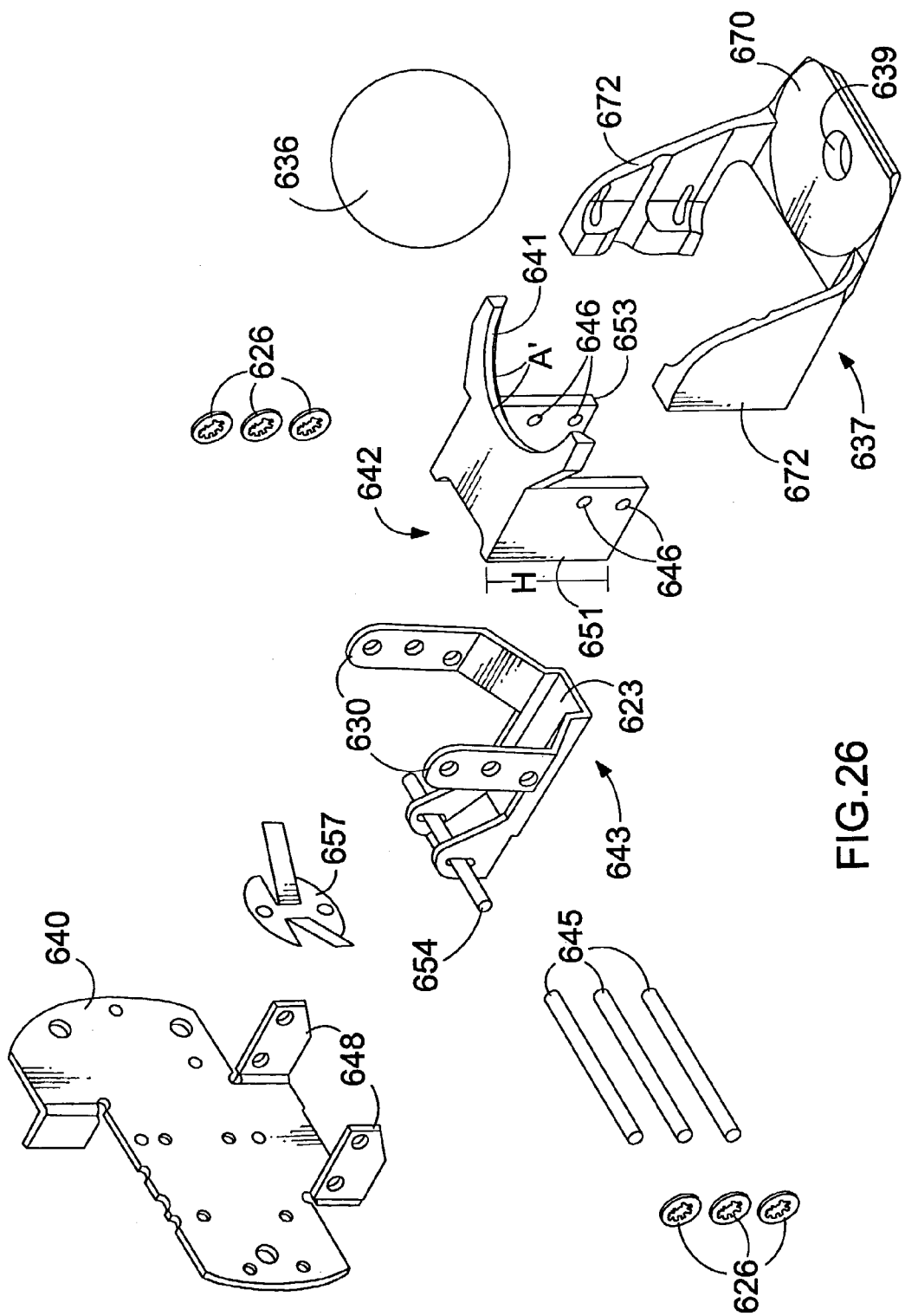
FIG. 26 is an exploded perspective view of the shock actuated responsive mechanism with an improved leveraged valve closing actuation means in accordance with the alternative embodiment of the present invention illustrated in FIGS. 24 and 25.

Referring to FIGS. 24, 25 and 26, there is shown at 610 an alternative embodiment of the present invention shock and vibration force responsive valve assembly with an improved leveraged valve closing actuation means which is adapted to automatically close off the flow of a controlled fluid such as natural gas through a conduit in response to seismic forces or other shock forces of a predetermined magnitude. This embodiment of the present invention is very similar to the embodiment just discussed above and the only difference is the nature and configuration of the projection trip arm 623 which is located underneath the ball 636 and the vertical plate 640 of the shock actuated responsive mechanism 625. In addition, the trip fork mechanism is inverted 180 degrees so that the circular base page 641 is located above the ball rather than below the ball as will be discussed later on. All of the parts of this embodiment are correspondingly numbered in a 600 series reference number rather than a 500 series reference number used in the embodiment just discussed above.

The valve assembly 610 includes a tubular main valve body 611 having flanges 612 and 613 at its opposite ends connectable by fasteners to abutting flanges of adjacent conduit sections or pipe sections (not shown) to connect the main body 611 into a pipeline. It may be assumed that natural gas or another controlled fluid flows in an upward direction (bottom to top) as shown by the flow arrow 609 through an inner passage 616 formed in the main body 611 and parallel to a central vertical axis 617 of the inner passage 616.

The valve assembly 610 further includes a flow control mechanism which has a circular disc valve 618 engageable with an annular seat 619 formed in the main valve body 611 to close off the flow of fluid through the valve assembly 610. The disc valve 618 is carried by a swing arm 620 which swings about a horizontal axis 621 between the closed condition (see FIG. 25) and the open condition (also see FIG. 25). The arm 620 and the carried disc valve 618 are releasably retained in the open condition of the valve by engagement of the arm 620 with a latch pin 654 carried by a projection trip arm 623. The trip arm 623 is in turn releasably retained in its position by a shock responsive mechanism 625 which is contained within a dome shaped housing cover 658 having a bulge. The housing cover 658 is attached to the tubular main body 611 at annular flanges 662 which have a sealing O-Ring 663 or other gasket. The housing cover 658 is retained by a circular clamp typically formed of two semicircular sections secured together at their opposite ends by fasteners such as screws, rivets, or other suitable fasteners.

The shock actuated responsive mechanism 625 includes a weight or mass 636, such as a metal ball. When the disc valve 618 is in the open position, the ball 636 is supported on a cradle 637 which extends outwardly and away from the main body 611. The cradle 637 has a flat horizontal base plate 670 and two opposite arms that extend away from the base plate 670 and attach to a vertical plate 640 which is then attached to the main body 611 by fasteners. The base plate 670 has a circular recess 639 therethrough which has contour to normally retain the ball 636 in its centered position. The ball 636 is displaceable from the centered position relative to the cradle 637, as to the position represented in broken lines in FIG. 25, by shock induced movement of the cradle 637 relative to the ball 636, during which movement the inertia of the weight resists movement thereof with the cradle 637.

A trip fork mechanism 642 is disposed between the two opposite arms 672 of the cradle 637 and located adjacent to the base plate 670 and is movable in a horizontal direction relative to the cradle 637. The trip fork mechanism 642 comprises a semicircular base member 641 which is contoured at an angle "$A^1$" relative to the horizontal. The angle "$A^1$" is preferably 45 degrees although any angle from 15 degrees to 75 degrees will function with the alternative embodiment of the present invention. The trip fork mechanism 642 further comprises a pair of spaced apart parallel vertical walls 651 and 653 having two openings 646 in each of the vertical walls. The improvement in the present invention involves doubling the height H of the vertical walls 651 and 653. The new design increases the leverage of the force so it reduces the required weight of the ball to produce the same force as with the immediately previous alternative design. By using a ball of the same weight, the inertia force is increased because of the increased leverage of the action of the ball 636 against the semicircular base member 641 having an impact on the vertical walls 651 and 653 which doubles the leverage in view of the fact that the height of the vertical wall is increased. The trip fork mechanism 642 is mounted for horizontal movement by a movable mechanism 643, including a projection trip arm 623, and a pair of parallel links 630 extending downwardly from the trip arm 623, the pair of links pivoted on the vertical walls 651 and 653 of the trip fork mechanism 642 by horizontal pins 645 extending through the horizontal openings 646 in the vertical walls 651 and 653 of the trip fork mechanism 642 and secured by a pair of fasteners 626, the pair of links pivoted by a second parallel horizontal arm 647 to a pair of horizontal bracket arms 648 projecting outwardly from and attached to the vertical plate 640 and secured by a second pair of fasteners 632. The second set of parallel links illustrated in FIG. 20 of the previous embodiment is not necessary in this alternative embodiment. The concept of the present invention improvement is that the lower two sets of horizontal pins extend through openings 646 in elongated vertical wall 651 and 653 to attach the longer vertical wall to the one set of parallel links 630 and by having this increased height, the leverage of the action of the ball 636 against the semicircular base member 651 increases the force so that the inertial force of action to close the valve is increased because of the increased leverage due to the increased vertical height of walls 651 and 653. In addition to these changes, for this embodiment where gas flows from bottom to top, it is found to be advantageous to orient the trip fork mechanism 180 degrees from the previous embodiment so that the horizontal base member 641 rests above ball 636. Having the trip fork mechanism oriented in 180 variation from the previous embodiment works better with the valve closing means in the orientation as depicted in FIG. 25. With the horizontal base plate located below the ball 636, it could possibly serve to interfere with the tripping of the valve. By having the horizontal base plate 641 located above the ball 636, no such interference occurs.

Referring to FIG. 26, the trip fork mechanism 642 is mounted for horizontal movement by a movable mechanism 643 which by way of example is a mechanism 643 including a projection trip arm 623, and a pair of parallel links 630 extending upwardly from the trip arm 623, the pair of links respectively pivoted at one end of vertical walls 651 and 653 by horizontal pins 645 extending through the horizontal openings 646 and secured by a pair of fasteners 626. The second set of parallel links illustrated in FIG. 20 of the previous embodiment is not necessary in this alternative embodiment. The concept of the present invention improvement is that the lower two sets of horizontal pins extend through openings 646 in elongated vertical walls 651 and 653 to attach the longer vertical wall to the one set of parallel links 630 and by having this increased height, the leverage of the action of the ball 636 against the semicircular base member 651 increases the force so that the inertial force of action to close the valve is increased because of the increased leverage due to the increased vertical height of walls 651 and 653. The projection trip arm 623 is located below the ball 630. A horizontal movement of the trip fork mechanism 642 causes a cross pin 654 to release the swing arm 620 for closure of the valve assembly 610 by seating the disc valve 618 by a spring force.

The trip fork mechanism 646 is yieldingly urged outwardly by a leaf spring or plate spring 657 which is mounted by rivets to the vertical plate 640. When the ball 636 is moved laterally from its centered position in any horizontal direction relative to the cradle 637, the weight engages the semicircular base member 641 of trip fork mechanism 642 and the angle "$A^1$" further enables the inertia as well as the weight of the ball to act upon the ball 636 to act upon the trip fork mechanism 646 and causes the trip fork mechanism 642 to move horizontally relative to the cradle 637 and move the cross pin 654 carried on the projection trip arm 623 and allows horizontal swinging movement of the projection trip arm 623 to cause the disc valve 618 to close. The amount of shock or vibration force to displace the ball 636 from the circular recess 639 is determined by the shape of the recess 639 and the mass of the ball 636.

The ball 636 and its associated parts are enclosed within the dome shaped housing cover 658 which is attached to and projects outwardly from the main valve body 611. Thus, the housing cover 658 effectively closes an opening 624 at the side of the main body 611. When a shock or vibration force is experienced by the shock actuated responsive mechanism 625, the ball 636 is displaced when such force reaches a specified value. If the force is of sufficient strength and duration, the ball 636 is urged upwardly and out of the circular recess 639. The ball 636 rattles around within the housing cover 658 and there is no way to know which direction the ball 636 will rattle since it is in a horizontal configuration. The ball 636 might rattle directly against the ball member 641 of trip fork mechanism 642 to trip the valve assembly 610. Alternatively, it can rattle sideways against the housing cover 658 or up, front or back against the housing cover and ricochet off the housing cover to then strike the trip fork mechanism 642 to trip the valve assembly. The ball 636 can rotate 360° in any direction, and thereby hits the housing cover 658 and then ricochets off the housing cover 658 and strikes the trip fork mechanism 642 to activate the valve assembly to cover the disc valve 618. The ball 636 thus automatically resets itself in the centered position when permitted to do so. By way of example, only the weight or ball 636 can be made of steel.

Defined in detail, the present invention is a vertical shock actuated valve assembly adapted to automatically close off the flow of a controlled fluid through a conduit in response to a shock or vibration force of a predetermined magnitude and having a shock actuated responsive mechanism comprising: (a) a cradle having a horizontal base plate and a pair of arms extending away from the horizontal base plate and opposing each other and attached to a vertical plate which in turn is attachable to a main body of said valve assembly, the horizontal base plate having a central circular bore therethrough in which a weight in the form of a ball is supported and retained thereon; (b) a mechanism including a projection trip arm, a pair of parallel links extending from said trip arm, the mechanism movably attached to the valve assembly by pin means extending through said pair of parallel links; (c) a trip fork mechanism having a contoured semicircular base member and a pair of elongated spaced apart vertical walls by which the trip fork mechanism is secured between said parallel links of said mechanism by pin means, the elongated vertical walls providing additional leverage when a force is applied on the semicircular base plate, the trip fork mechanism located adjacent to said horizontal base plate such that the contoured semicircular base member faces said ball; and (d) a housing cover enclosing said ball, said cradle, said mechanism, and said trip fork mechanism so that when said ball is moved out of said central circular bore and retained on said horizontal base plate by the housing cover and rattles around and ricochets off the interior of the housing cover, the ball thereby strikes said contoured semicircular base member of said trip fork mechanism to cause a cross pin to release a swing arm to cause a valve member to move against a valve seat and thereby activate said valve assembly to stop the flow of the fluid therethrough.

Defined broadly, the present invention is a vertical shock actuated valve assembly having valve closing means and adapted to automatically close off the flow of a fluid through a conduit in response to a shock or vibration force of a predetermined magnitude and having a shock actuated responsive mechanism comprising: (a) a cradle having a horizontal plate and at least two arms extending away from the horizontal plate and attached to a vertical plate which in turn is attachable to a main body of said valve assembly, the horizontal plate having a central bore therethrough in which a weight is supported and retained thereon; (b) a mechanism including a projection trip arm having attachment means extending therefrom, the mechanism movably attached to the valve assembly by said attachment means; (c) a trip fork mechanism having a base member and a pair of elongated spaced apart vertical walls by which the trip fork mechanism is secured between said attachment means of said mechanism, the elongated vertical walls providing additional leverage when a force is applied on said horizontal base member, the trip fork mechanism located adjacent to said horizontal base plate such that the base member faces said weight; and (d) a cover enclosing said weight, said cradle, said mechanism, and said trip fork mechanism so that when said weight is moved out of said central bore and retained on said horizontal plate by the cover and rattles around and ricochets off the interior of the cover, the ball thereby strikes said base member of said trip fork mechanism to activate valve closing means of said valve assembly to stop the flow of the fluid therethrough.

Defined more broadly, the present invention is a vertical shock actuated valve assembly having a valve closing means and having a shock actuated responsive mechanism comprising: (a) a horizontal plate having a bore therethrough in which a weight is supported and retained centrally on the horizontal plate, the horizontal plate attached to the valve assembly; (b) a movable mechanism movably attached to the valve assembly; (c) a trip fork mechanism having a base member and a pair of elongated spaced apart vertical walls by which the trip fork mechanism is movably attached to said movable mechanism, the elongated vertical walls providing additional leverage when a force is applied on said base member, the trip fork mechanism located adjacent to said horizontal plate such that the base member faces said weight; and (d) a cover enclosing said weight, said horizontal plate, said movable mechanism, and said trip fork mechanism so that when said weight is moved out of said bore and retained on said horizontal plate by the cover and rattles around and ricochets off the interior of the cover, the ball thereby strikes said base member of said trip fork mechanism to activate the valve closing means of said valve assembly to stop the flow of the fluid therethrough.

Defined even more broadly, the present invention is a shock actuated valve assembly having a shock actuated responsive mechanism comprising: (a) a horizontal plate having a bore therethrough in which a weight is supported and retained centrally on the horizontal plate, the horizontal plate attached to the valve assembly; (b) a movable mechanism movably attached to the valve assembly; (c) a trip fork mechanism having a base member and elongated means to movably attach the trip fork mechanism to said movable mechanism, the elongated means providing additional leverage when a force is applied to the base member, the trip fork mechanism located adjacent to the horizontal plate such that the base member faces said weight; and (d) a cover enclosing said weight, said horizontal plate, said movable mechanism, and said trip fork mechanism so that when said weight is moved out of said bore and retained on said horizontal plate by the cover and rattles around and ricochets off the interior of the cover, the weight thereby strikes said base member of said trip fork mechanism to activate said valve assembly to stop the flow of the fluid therethrough.

Further defined more broadly, the present invention is a vertical shock actuated valve assembly adapted to automatically close off the flow of a controlled fluid through a conduit in response to a shock or vibration force of a predetermined magnitude and having a shock actuated responsive mechanism comprising: (a) a horizontal plate having a bore therethrough in which a weight is supported and retained centrally on the horizontal plate, the horizontal plate attached to the valve assembly; (b) a movable mechanism movably attached to the valve assembly; and (c) a trip fork mechanism having a base member and elongated means to movably attach the trip fork mechanism to said movable mechanism, the elongated means providing additional leverage when a force is applied to the base member, the trip fork mechanism located adjacent to the horizontal plate such that the base member faces said weight; (d) whereby when the shock or vibration force is experienced by said shock actuated responsive mechanism, said weight is displaced when such force reaches the predetermined magnitude causing said weight to roll out of said bore to strike said trip fork mechanism to cause the trip fork mechanism to move in a horizontal direction to thereby actuate and close said valve assembly to stop the flow of the fluid therethrough.

Further defined even more broadly, the present invention is a shock actuated valve having a shock responsive mechanism comprising: (a) a horizontal plate having a bore therethrough in which a weight is supported and retained centrally on the horizontal plate and means for attaching to a main body of said shock actuated valve; and (b) a trip fork mechanism having elongated walls and having at least a portion located adjacent to said weight; (c) whereby when the shock or vibration force is experienced by said shock responsive mechanism, said weight is displaced when such force reaches the predetermined magnitude causing said weight to move out of said bore to strike said trip fork mechanism and cause it to move in a horizontal direction to thereby actuate and close said shock actuated valve to stop the flow of the fluid therethrough.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A vertical shock actuated valve assembly adapted to automatically close off the flow of a controlled fluid through a conduit in response to a shock or vibration force of a predetermined magnitude and having a shock actuated responsive mechanism comprising:
   a. a cradle having a horizontal base plate and a pair of arms extending away from the horizontal base plate and opposing each other and attached to a vertical plate which in turn is attachable to a main body of said valve assembly, the horizontal base plate having a central circular bore therethrough in which a weight in the form of a ball is supported and retained thereon;
   b. a mechanism including a projection trip arm, a pair of parallel links extending from said trip arm, the mechanism movably attached to the valve assembly by pin means extending through said pair of parallel links;
   c. a trip fork mechanism having a contoured semicircular base member and a pair of elongated spaced apart vertical walls by which the trip fork mechanism is secured between said parallel links of said mechanism by pin means, the elongated vertical walls providing additional leverage when a force is applied on the semicircular base plate, the trip fork mechanism located adjacent to said horizontal base plate such that the contoured semicircular base member faces said ball; and
   d. a housing cover enclosing said ball, said cradle, said mechanism, and said trip fork mechanism so that when said ball is moved out of said central circular bore and retained on said horizontal base plate by the housing cover and rattles around and ricochets off the interior of the housing cover, the ball thereby strikes said contoured semicircular base member of said trip fork mechanism to cause a cross pin to release a swing arm to cause a valve member to move against a valve seat and thereby activate said valve assembly to stop the flow of the fluid therethrough.

2. The shock actuated responsive mechanism in accordance with claim 1, wherein said ball is made of steel.

3. The shock actuated responsive mechanism in accordance with claim 1, wherein said contour of said semicircular base member is at a 45 degree angle to the horizontal.

4. The shock actuated responsive mechanism in accordance with claim 1, wherein said contoured semicircular base member faces a lower portion of the ball and said pair of elongated spaced apart vertical walls extend upwardly therefrom.

5. The shock actuated responsive mechanism in accordance with claim 1, wherein the contoured semicircular base member faces an upper portion of the ball and the pair of elongated spaced apart vertical walls extend downwardly therefrom.

6. A vertical shock actuated valve assembly having valve closing means and adapted to automatically close off the flow of a fluid through a conduit in response to a shock or vibration force of a predetermined magnitude and having a shock actuated responsive mechanism comprising:
   a. a cradle having a horizontal plate and at least two arms extending away from the horizontal plate and attached to a vertical plate which in turn is attachable to a main body of said valve assembly, the horizontal plate having a central bore therethrough in which a weight is supported and retained thereon;
   b. a mechanism including a projection trip arm having attachment means extending therefrom, the mechanism movably attached to the valve assembly by said attachment means;
   c. a trip fork mechanism having a base member and a pair of elongated spaced apart vertical walls by which the trip fork mechanism is secured between said attachment means of said mechanism, the elongated vertical walls providing additional leverage when a force is applied on said horizontal base member, the trip fork mechanism located adjacent to said horizontal base plate such that the base member faces said weight; and
   d. a cover enclosing said weight, said cradle, said mechanism, and said trip fork mechanism so that when said weight is moved out of said central bore and retained on said horizontal plate by the cover and rattles around and ricochets off the interior of the cover, the ball thereby strikes said base member of said trip fork mechanism to activate valve closing means of said valve assembly to stop the flow of the fluid therethrough.

7. The shock actuated responsive mechanism in accordance with claim 4, wherein said weight is a ball.

8. The shock actuated responsive mechanism in accordance with claim 5, wherein said ball is made of steel.

9. The shock actuated responsive mechanism in accordance with claim 4, wherein said base member is configured to be semicircular in shape and has a contoured surface which faces the weight.

10. The shock actuated responsive mechanism in accordance with claim 7, wherein said contour of said base member is at an angle of approximately 45 degrees to the horizontal.

11. The shock actuated responsive mechanism in accordance with claim 6, wherein said base member faces a lower portion of the weight and said pair of elongated spaced apart vertical walls extend upwardly therefrom.

12. The shock actuated responsive mechanism in accordance with claim 6, wherein the base member faces an upper portion of the ball and the pair of elongated spaced apart vertical walls extend downwardly therefrom.

13. A vertical shock actuated valve assembly having a valve closing means and having a shock actuated responsive mechanism comprising:
   a. a horizontal plate having a bore therethrough in which a weight is supported and retained centrally on the horizontal plate, the horizontal plate attached to the valve assembly;
   b. a movable mechanism movably attached to the valve assembly;
   c. a trip fork mechanism having a base member and a pair of elongated spaced apart vertical walls by which the trip fork mechanism is movably attached to said movable mechanism, the elongated vertical walls providing additional leverage when a force is applied on said base member, the trip fork mechanism located adjacent to said horizontal plate such that the base member faces said weight; and d. a cover enclosing said weight, said horizontal plate, said movable mechanism, and said trip fork mechanism so that when said weight is moved out of said bore and retained on said horizontal plate by the cover and rattles around and ricochets off the interior of the cover, the ball thereby strikes said base member of said trip fork mechanism to activate the valve closing means of said valve assembly to stop the flow of the fluid therethrough.

14. The shock actuated responsive mechanism in accordance with claim 13, wherein said weight is a ball.

15. The shock actuated responsive mechanism in accordance with claim 14, wherein said ball is made of steel.

16. The shock actuated responsive mechanism in accordance with claim 13, wherein said base member is configured to be semicircular in shape and has a contoured surface which faces the weight.

17. The shock actuated responsive mechanism in accordance with claim 16, wherein said contour of said base member is at an angle of approximately 45 degrees to the horizontal.

18. The shock actuated responsive mechanism in accordance with claim 13, wherein the base member faces a lower portion of the weight and said pair of elongated spaced apart vertical walls extend upwardly therefrom.

19. The shock actuated responsive mechanism in accordance with claim 13, wherein the base member faces an upper portion of the weight and the pair of elongated spaced apart vertical walls extend downwardly therefrom.

20. A shock actuated valve assembly having a shock actuated responsive mechanism comprising:
   a. a horizontal plate having a bore therethrough in which a weight is supported and retained centrally on the horizontal plate, the horizontal plate attached to the valve assembly;
   b. a movable mechanism movably attached to the valve assembly;
   c. a trip fork mechanism having a base member and elongated means to movably attach the trip fork mechanism to said movable mechanism, the elongated means providing additional leverage when a force is applied to the base member, the trip fork mechanism located adjacent to the horizontal plate such that the base member faces said weight; and
   d. a cover enclosing said weight, said horizontal plate, said movable mechanism, and said trip fork mechanism so that when said weight is moved out of said bore and retained on said horizontal plate by the cover and rattles around and ricochets off the interior of the cover, the weight thereby strikes said base member of said trip fork mechanism to activate said valve assembly to stop the flow of the fluid therethrough.

21. The shock actuated responsive mechanism in accordance with claim 20, wherein said weight is a ball.

22. The shock actuated responsive mechanism in accordance with claim 21, wherein said ball is made of steel.

23. The shock actuated responsive mechanism in accordance with claim 20, wherein said base member is configured to be semicircular in shape and has a contoured surface which faces the weight.

24. The shock actuated responsive mechanism in accordance with claim 23, wherein said contour of said base member is at an angle of approximately 45 degrees to the horizontal.

25. The shock actuated responsive mechanism in accordance with claim 20, wherein said base member faces a lower portion of the weight and said elongated means extend upwardly therefrom.

26. The shock actuated responsive mechanism in accordance with claim 20, wherein the base member faces an upper portion of the weight and the elongated means extend downwardly therefrom.

27. A vertical shock actuated valve assembly adapted to automatically close off the flow of a controlled fluid through a conduit in response to a shock or vibration force of a predetermined magnitude and having a shock actuated responsive mechanism comprising:
   a. horizontal plate having a bore therethrough in which a weight is supported and retained centrally on the horizontal plate, the horizontal plate attached to the valve assembly;
   b. a movable mechanism movably attached to the valve assembly; and
   c. a trip fork mechanism having a base member and elongated means to movably attach the trip fork mechanism to said movable mechanism, the elongated means providing additional leverage when a force is applied to the base member, the trip fork mechanism located adjacent to the horizontal plate such that the base member faces said weight;
   d. whereby when the shock or vibration force is experienced by said shock actuated responsive mechanism, said weight is displaced when such force reaches the predetermined magnitude causing said weight to roll out of said bore to strike said trip fork mechanism to cause the trip fork mechanism to move in a horizontal direction to thereby actuate and close said valve assembly to stop the flow of the fluid therethrough.

28. The shock actuated responsive mechanism in accordance with claim 27, wherein said weight is a ball.

29. The shock actuated responsive mechanism in accordance with claim 28, wherein said ball is made of steel.

30. The shock actuated responsive mechanism in accordance with claim 27, wherein said base member is configured to be semicircular in shape and has a contoured surface which faces the weight.

31. The shock actuated responsive mechanism in accordance with claim 30, wherein said contour of said base member is at an angle of approximately 45 degrees to the horizontal.

32. The shock actuated responsive mechanism in accordance with claim 27, wherein said base member faces a lower portion of the weight and said elongated means extend upwardly therefrom.

33. The shock actuated responsive mechanism in accordance with claim 27, wherein the base member faces an upper portion of the weight and the elongated means extend downwardly therefrom.

34. A shock actuated valve having a shock responsive mechanism comprising:
   a. a horizontal plate having a bore therethrough in which a weight is supported and retained centrally on the horizontal plate and means for attaching to a main body of said shock actuated valve; and b. a trip fork mechanism having elongated walls and having at least a portion located adjacent to said weight;

c. whereby when the shock or vibration force is experienced by said shock responsive mechanism, said weight is displaced when such force reaches the predetermined magnitude causing said weight to move out of said bore to strike said trip fork mechanism and cause it to move in a horizontal direction to thereby actuate and close said shock actuated valve to stop the flow of the fluid therethrough.

35. The shock responsive mechanism in accordance with claim 34, wherein said weight is a ball.

36. The shock responsive mechanism in accordance with claim 35, wherein said ball is made of steel.

37. The shock responsive mechanism in accordance with claim 34, wherein said one end of said horizontal tube further comprises a beveled interior surface facing said weight.

38. The shock responsive mechanism in accordance with claim 34, further comprising a housing cover enclosing said weight and said horizontal plate so that when said weight is moved out of said bore and retained on said horizontal plate by the housing cover and rattles around and ricochets off the interior of the housing cover, the weight thereby strikes said trip fork mechanism to activate said shock actuated valve to stop the flow of the fluid therethrough.

\* \* \* \* \*